United States Patent
Chen et al.

(10) Patent No.: US 12,436,754 B2
(45) Date of Patent: Oct. 7, 2025

(54) OPERATING SYSTEM UPDATE METHOD, ELECTRONIC DEVICE, AND STORAGE MEDIUM

(71) Applicant: Honor Device Co., Ltd., Shenzhen (CN)

(72) Inventors: Chao Chen, Shenzhen (CN); Zenghui Zhang, Shenzhen (CN); Yanzhao Wang, Shenzhen (CN); Jiulin Huang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/268,055

(22) PCT Filed: Dec. 14, 2022

(86) PCT No.: PCT/CN2022/139052
§ 371 (c)(1),
(2) Date: Jun. 16, 2023

(87) PCT Pub. No.: WO2023/169035
PCT Pub. Date: Sep. 14, 2023

(65) Prior Publication Data
US 2024/0378042 A1 Nov. 14, 2024

(30) Foreign Application Priority Data
Mar. 11, 2022 (CN) .......................... 202210243332.7

(51) Int. Cl.
*G06F 8/65* (2018.01)
*G06F 3/06* (2006.01)
*G06F 9/4401* (2018.01)

(52) U.S. Cl.
CPC .............. *G06F 8/65* (2013.01); *G06F 9/4406* (2013.01); *G06F 3/0614* (2013.01); *G06F 3/0644* (2013.01); *G06F 3/0673* (2013.01)

(58) Field of Classification Search
CPC .. G06F 8/60–66; G06F 3/0614; G06F 3/0644; G06F 3/0673; G06F 9/4406
(Continued)

(56) References Cited

U.S. PATENT DOCUMENTS

| | | | | |
|---|---|---|---|---|
| 8,868,924 | B1 * | 10/2014 | Filatov | G06F 8/60 717/110 |
| 2005/0132382 | A1 | 6/2005 | McGuire et al. | |

(Continued)

FOREIGN PATENT DOCUMENTS

| | | |
|---|---|---|
| CN | 105843656 A | 8/2016 |
| CN | 107493290 A | 12/2017 |

(Continued)

OTHER PUBLICATIONS

Copy-on-write, Wikipedia, 2021, 5 pages, [retrieved on Jun. 9, 2025], Retrieved from the Internet: <URL:https://web.archive.org/web/20210106115125/https://en.wikipedia.org/wiki/Copy-on-write>.*

(Continued)

*Primary Examiner* — Geoffrey R St Leger
(74) *Attorney, Agent, or Firm* — Slater Matsil, LLP

(57) ABSTRACT

This application provides an operating system update method, an electronic device, and a storage medium. In the method, an installation manner of an update file corresponding to a sub-partition of a super partition depends on current available space of a user data partition and a size (a compressed size or an uncompressed size) of the update file, (Continued)

so that it can be determined, based on a specific case in an operating system update process, whether to use a cow compression function.

20 Claims, 22 Drawing Sheets

(58) Field of Classification Search
USPC .................................................. 717/168–178
See application file for complete search history.

(56) References Cited

U.S. PATENT DOCUMENTS

| | | |
|---|---|---|
| 2006/0190939 A1 | 8/2006 | Chen et al. |
| 2012/0304120 A1 | 11/2012 | Gelling |
| 2013/0167133 A1 | 6/2013 | Cao et al. |
| 2014/0289376 A1 | 9/2014 | Chan et al. |
| 2017/0090903 A1 | 3/2017 | Bainville et al. |
| 2019/0235758 A1 | 8/2019 | Constantinescu et al. |
| 2019/0305796 A1 | 10/2019 | Sofia |

FOREIGN PATENT DOCUMENTS

| | | | |
|---|---|---|---|
| CN | 110221856 A | 9/2019 | |
| CN | 111142896 A | 5/2020 | |
| CN | 113032032 A | 6/2021 | |
| CN | 113821233 A | 12/2021 | |
| CN | 113821235 A | 12/2021 | |
| CN | 114661322 A | 6/2022 | |
| EP | 2993582 A1 | 3/2016 | |
| WO | WO-2016186617 A1 * | 11/2016 | ........... G06F 16/128 |

OTHER PUBLICATIONS

Ye, Y., "Principle and Upgrading Practice of Linux Kernel"; Jisuanji Yu Xiandai Hua; Feb. 2002; 3 pages.

* cited by examiner

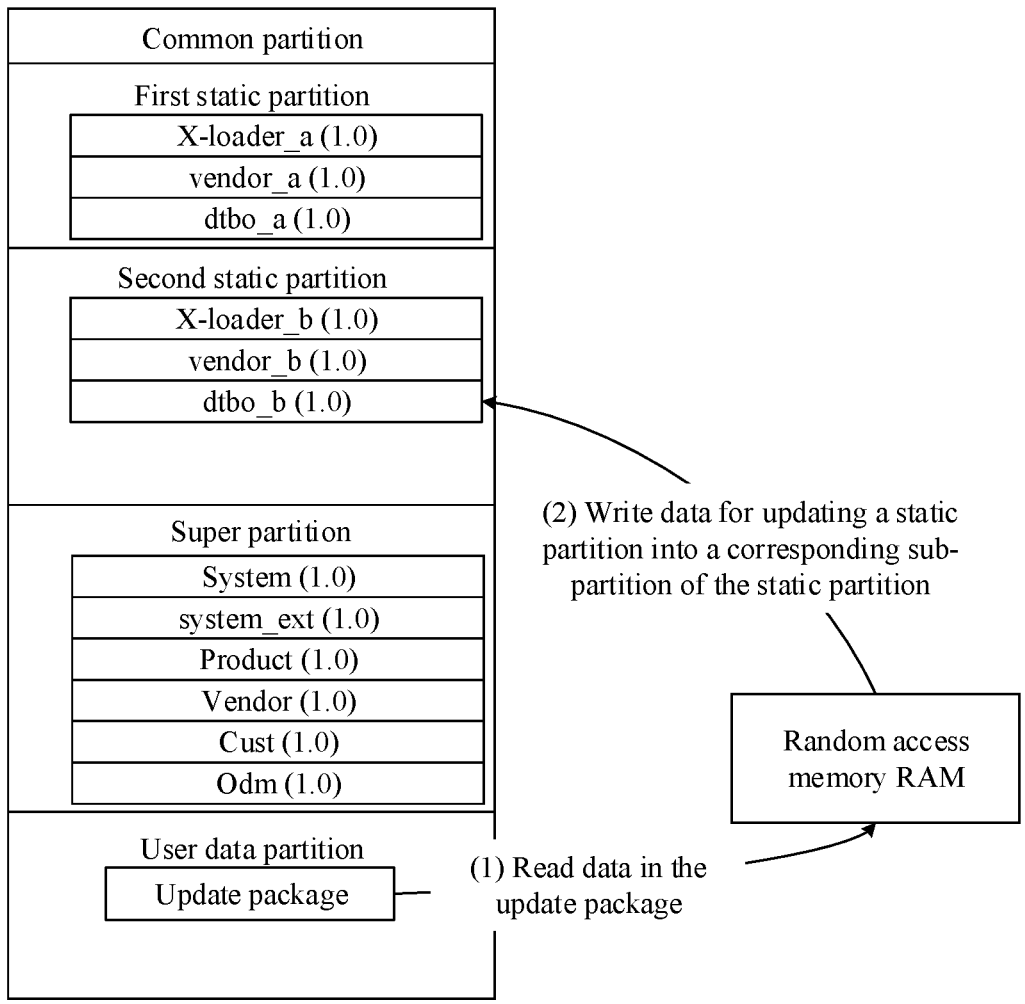
FIG. 5.1

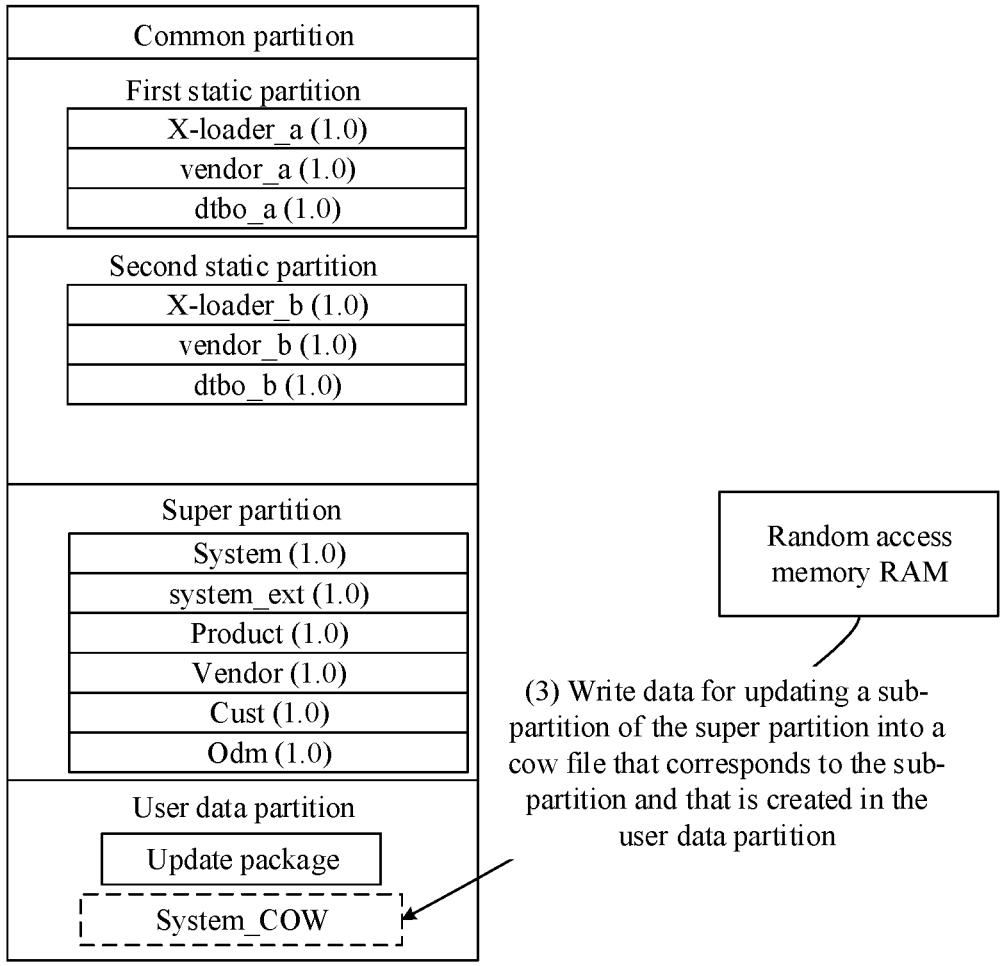
FIG. 5.2
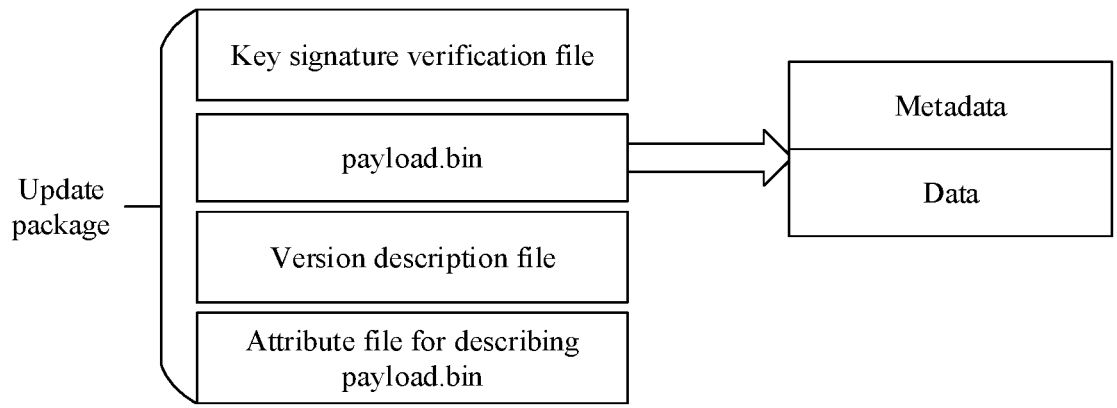
FIG. 5.3

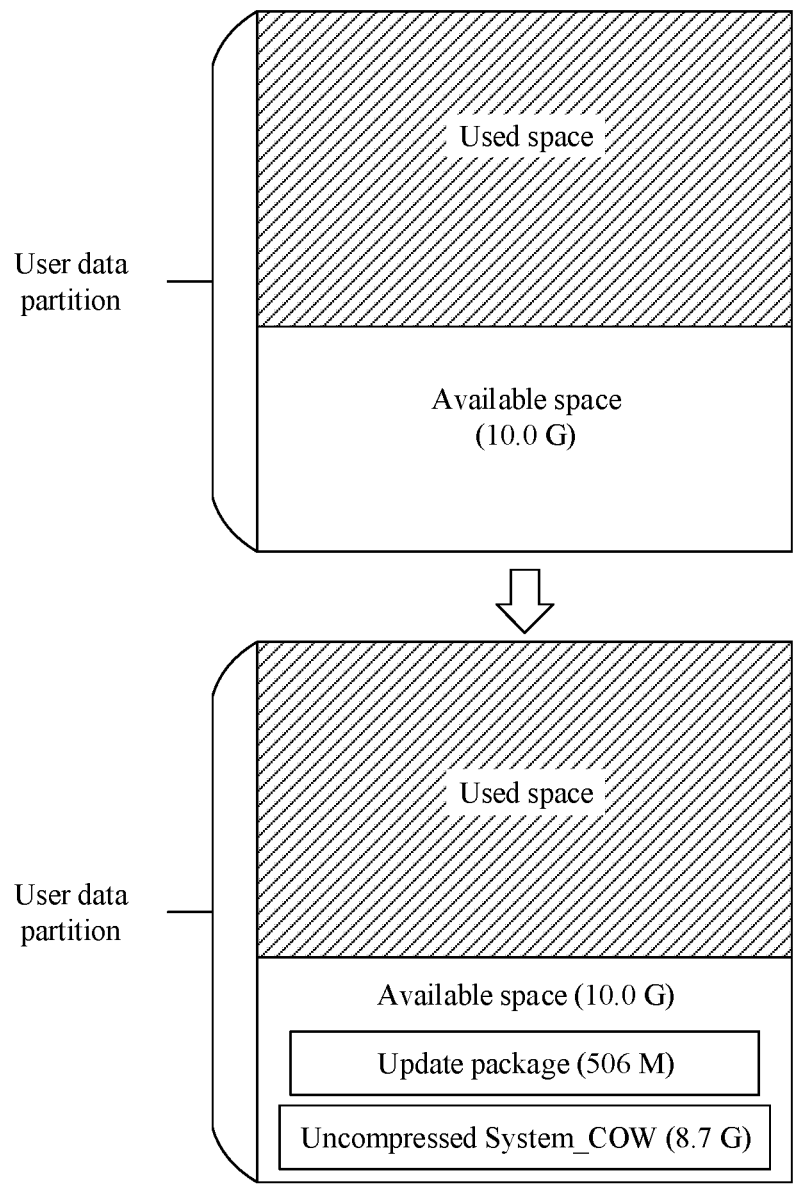
FIG. 6.1

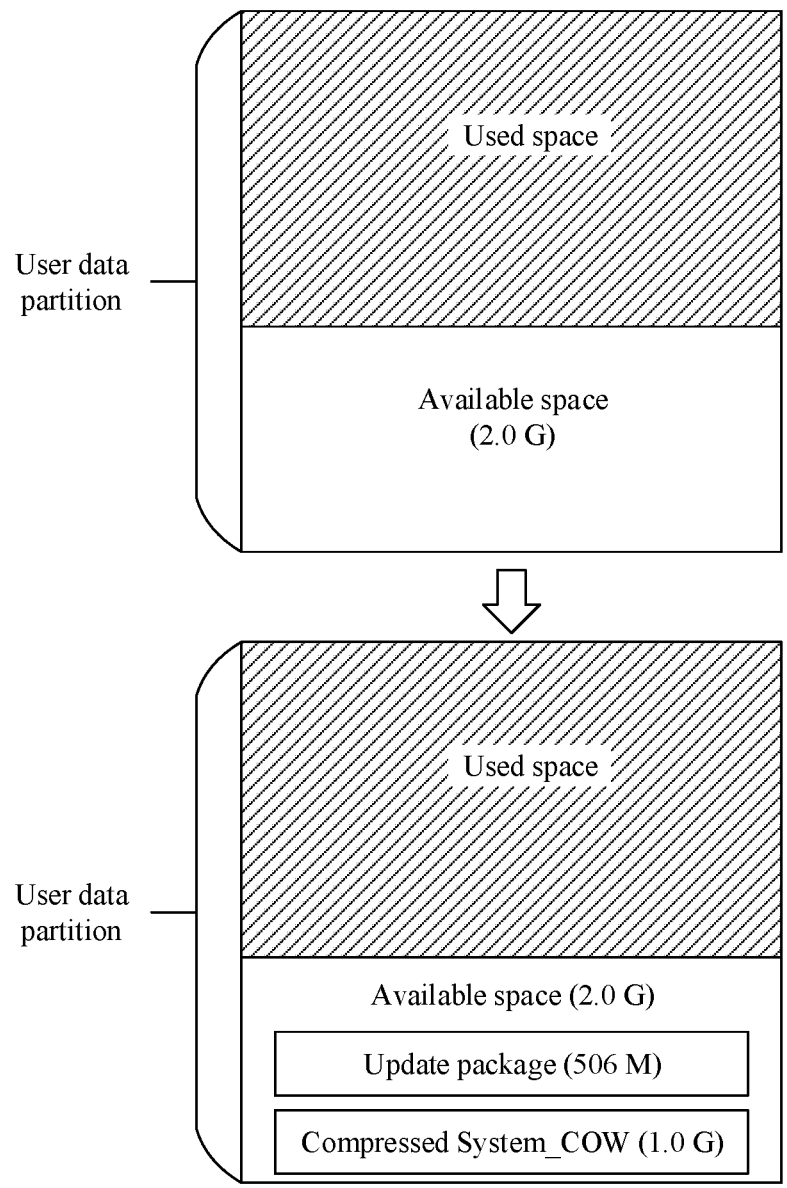
FIG. 6.2

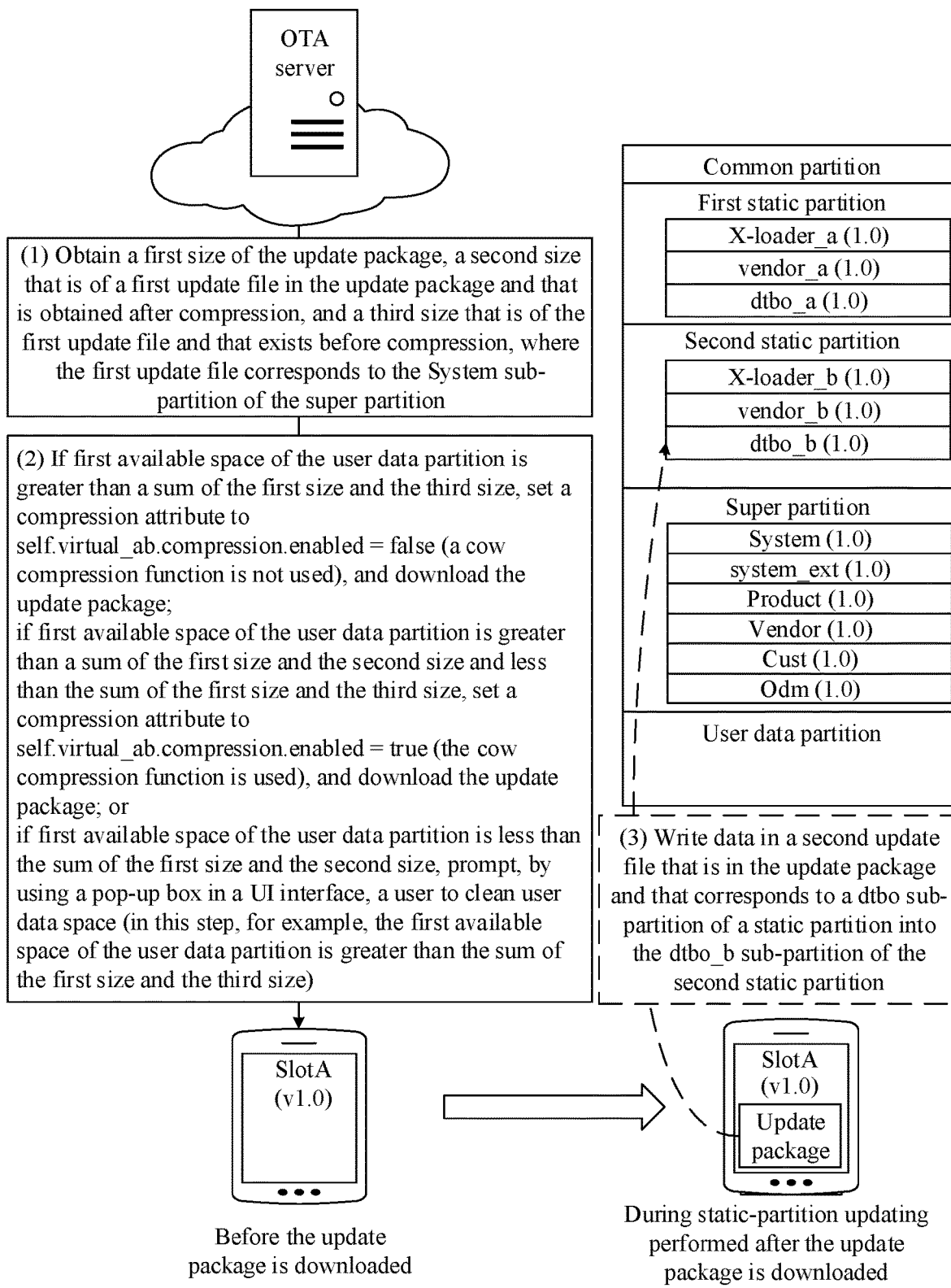
FIG. 7.1

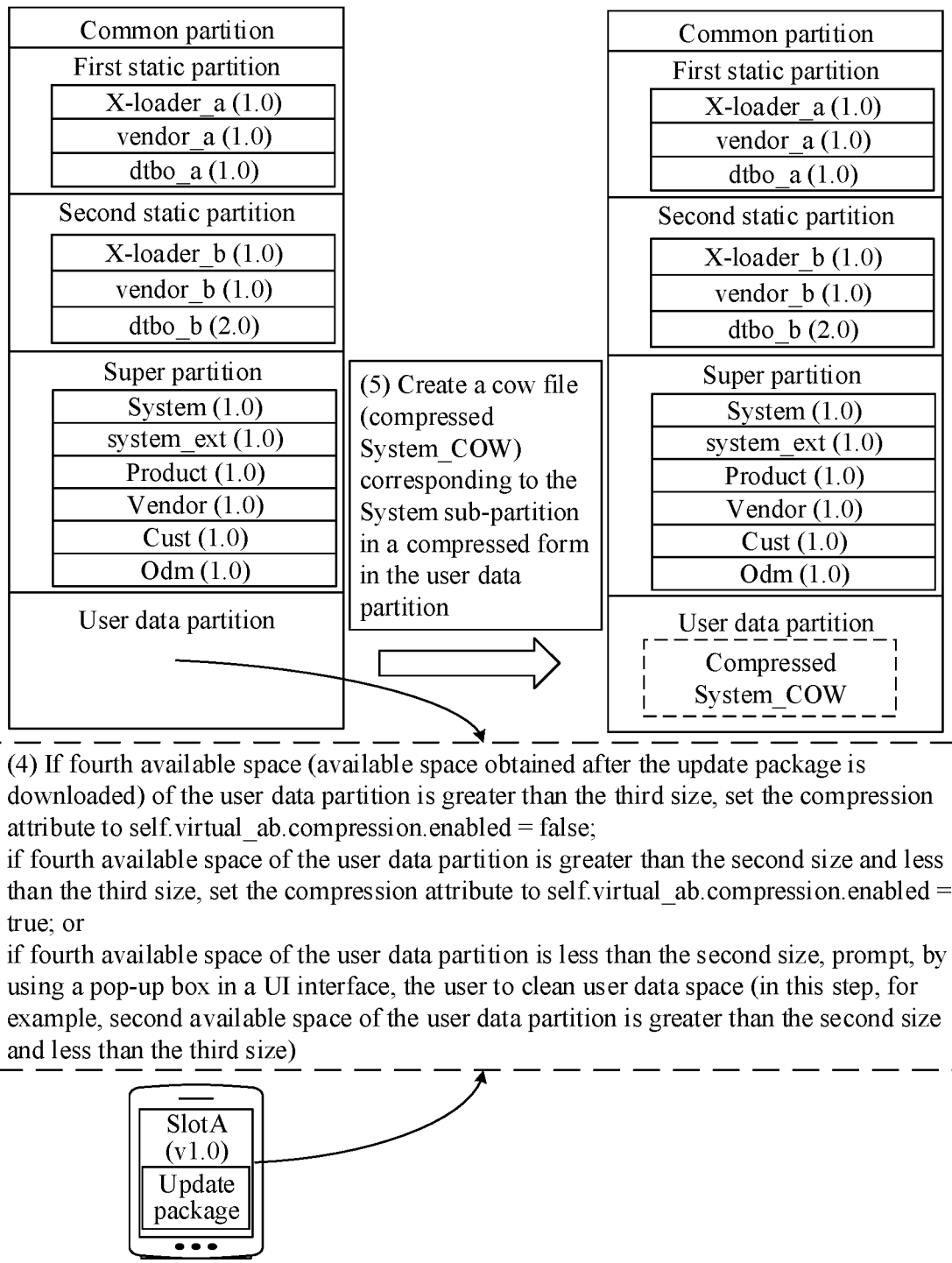
FIG. 7.2

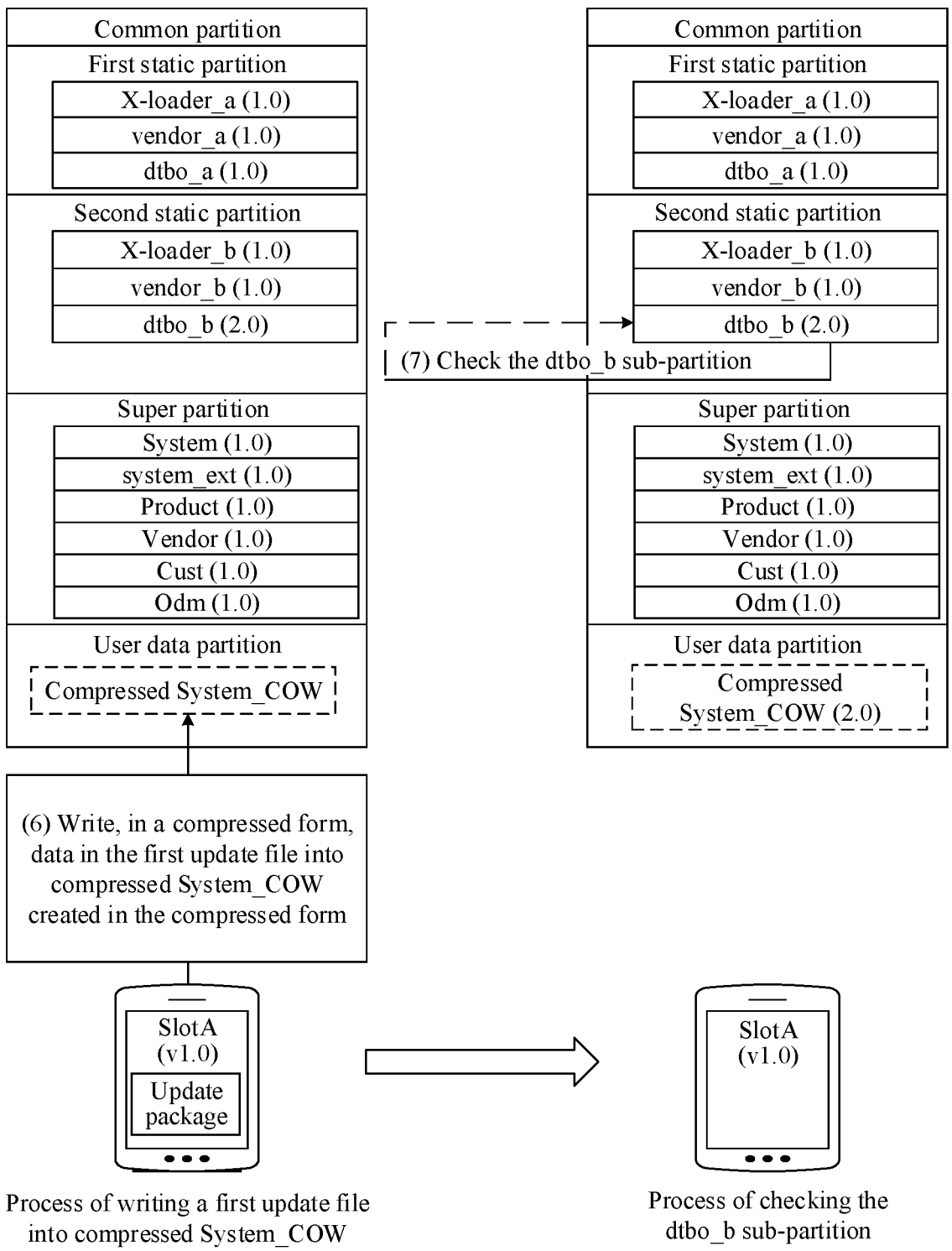
FIG. 7.3

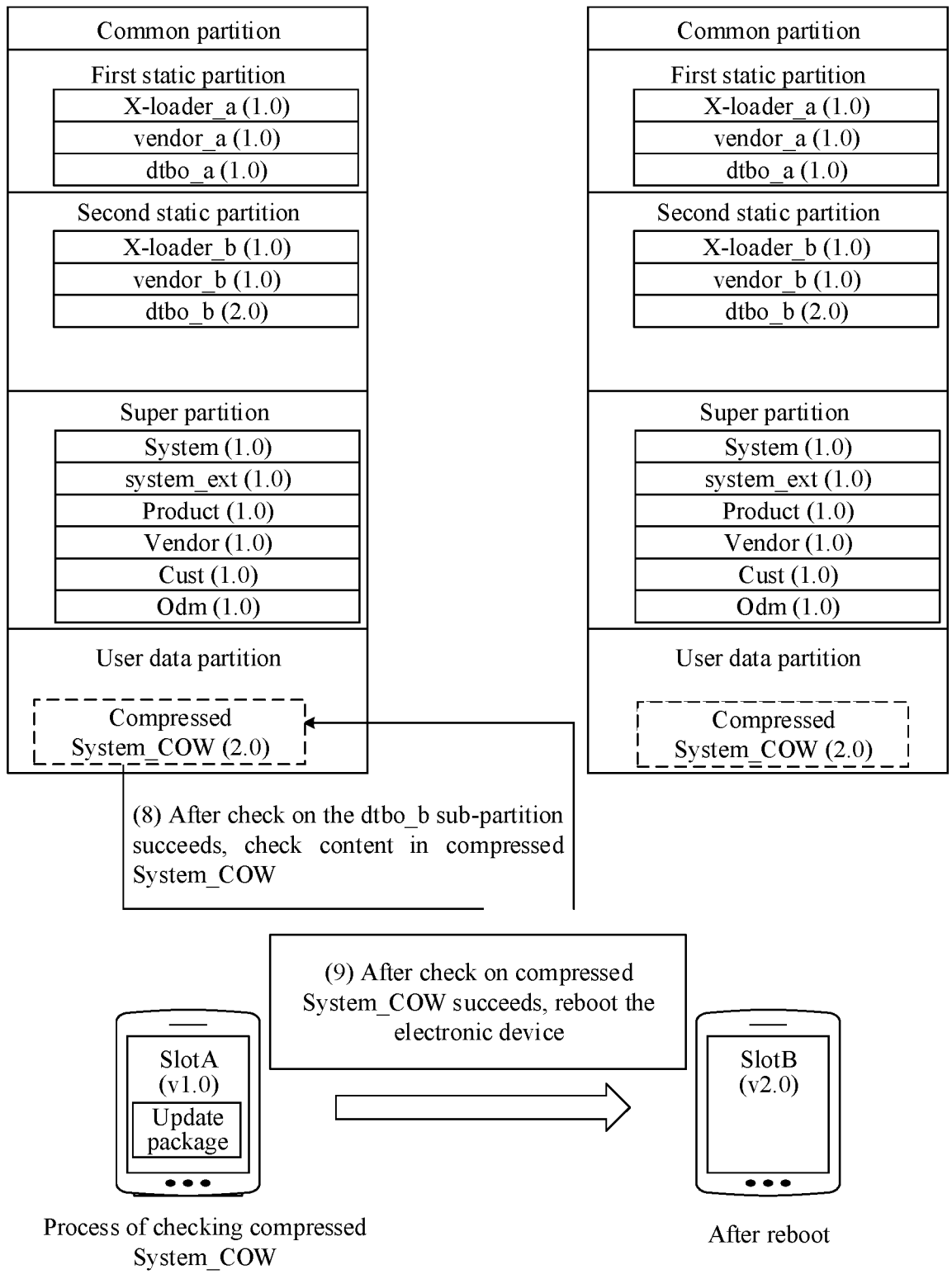
FIG. 7.4

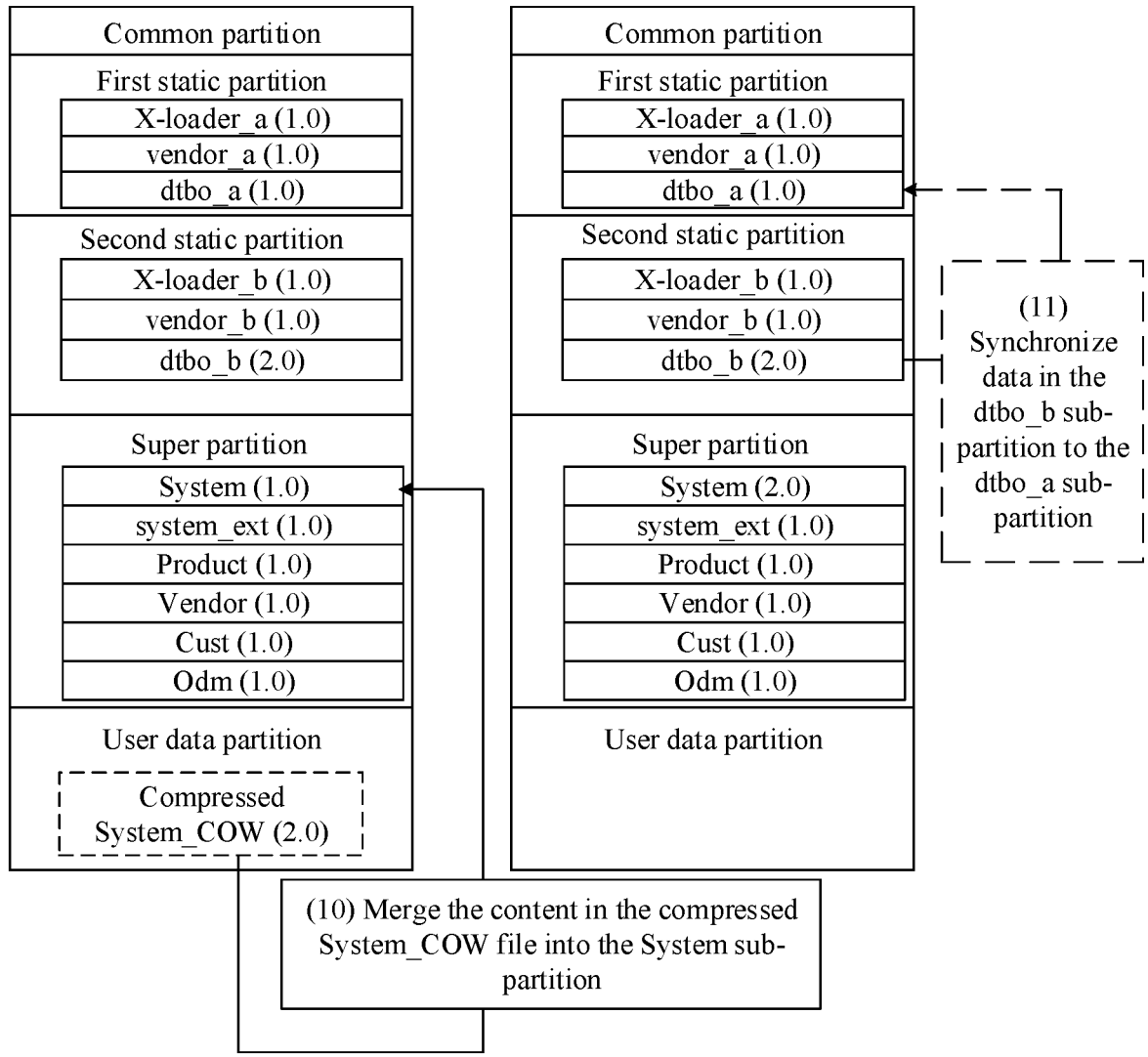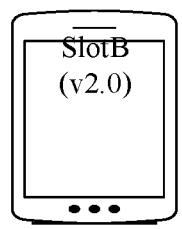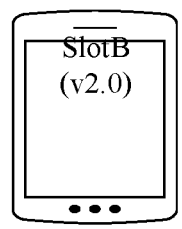
FIG. 7.5

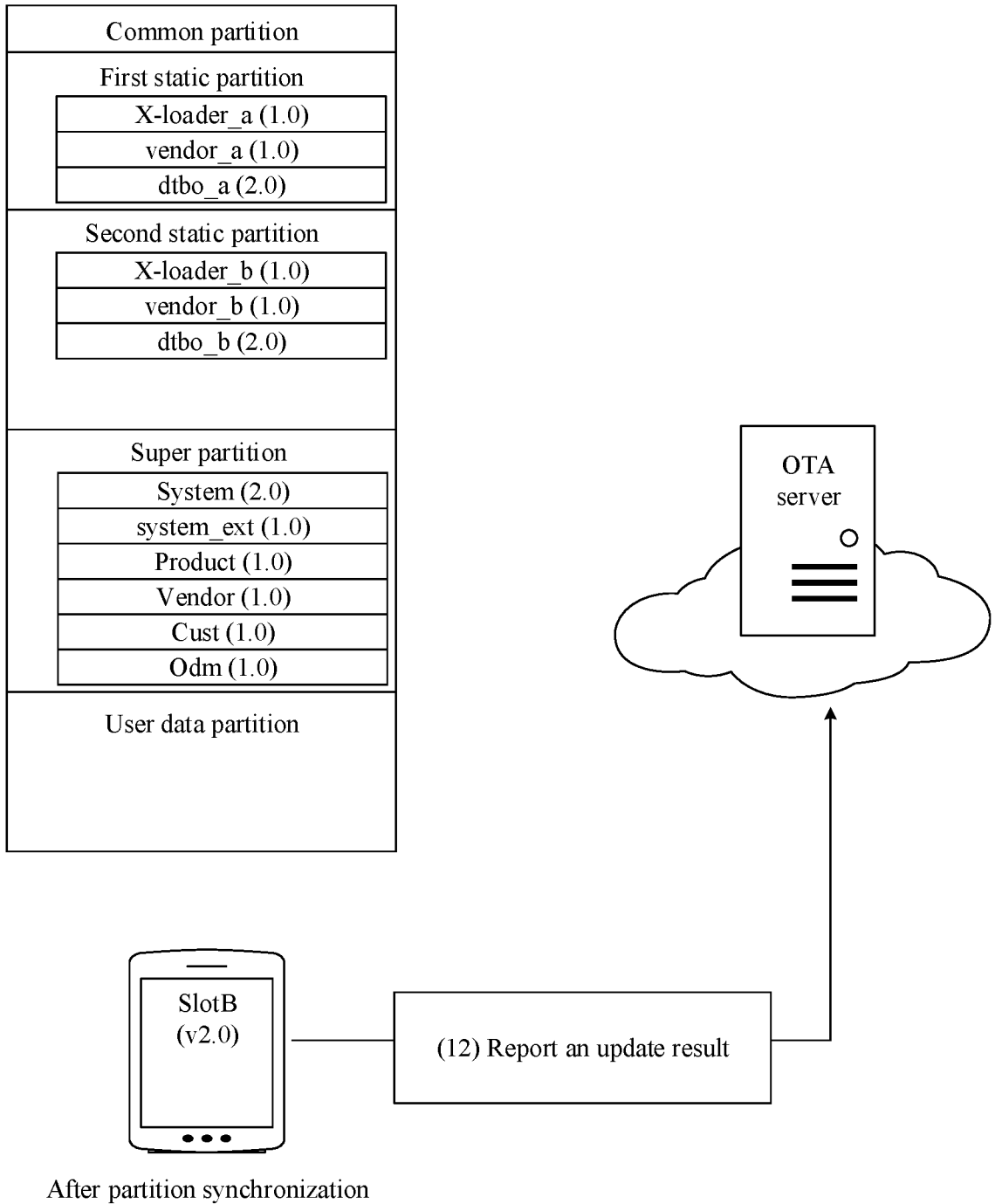
FIG. 7.6

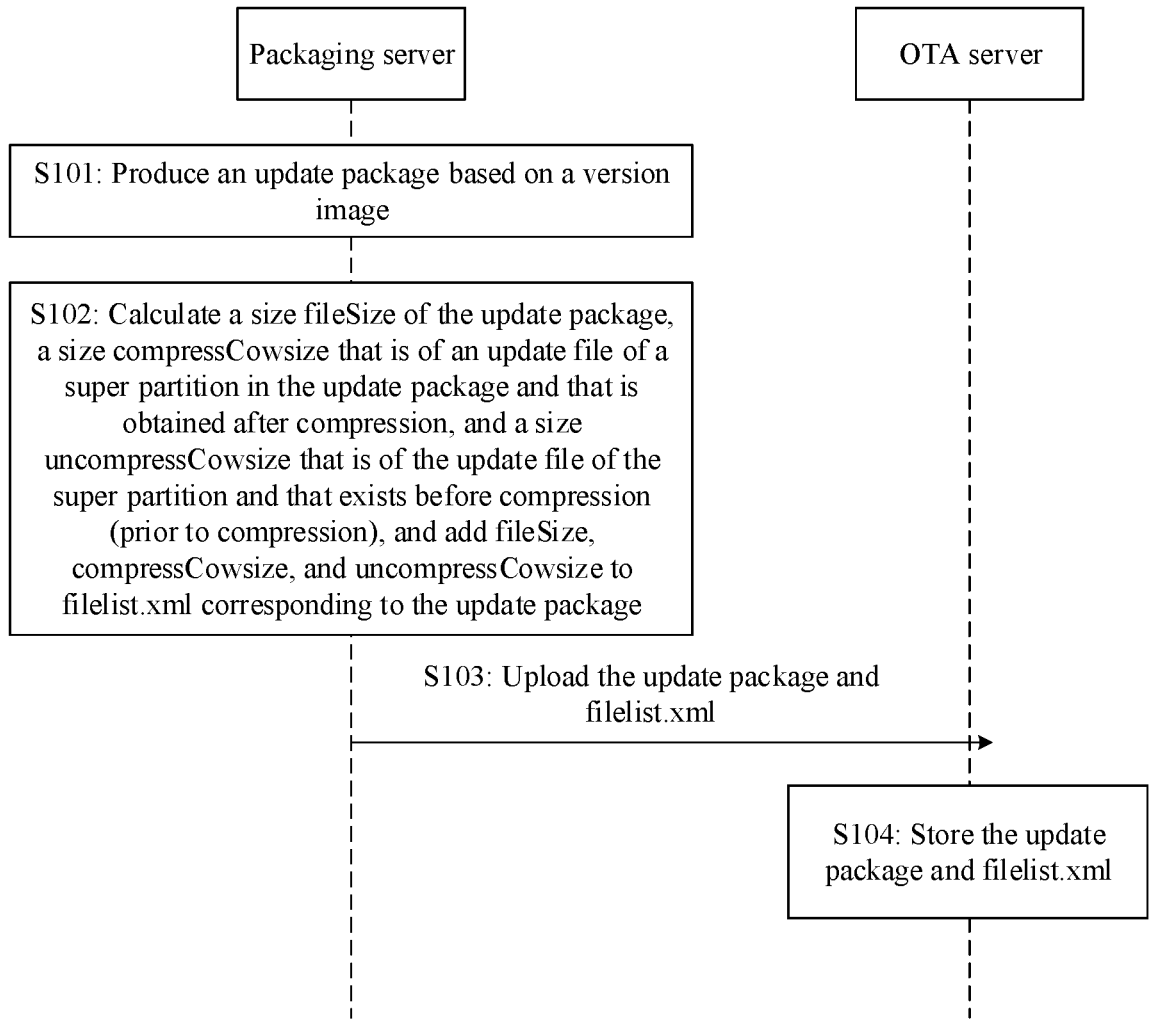
FIG. 8.1

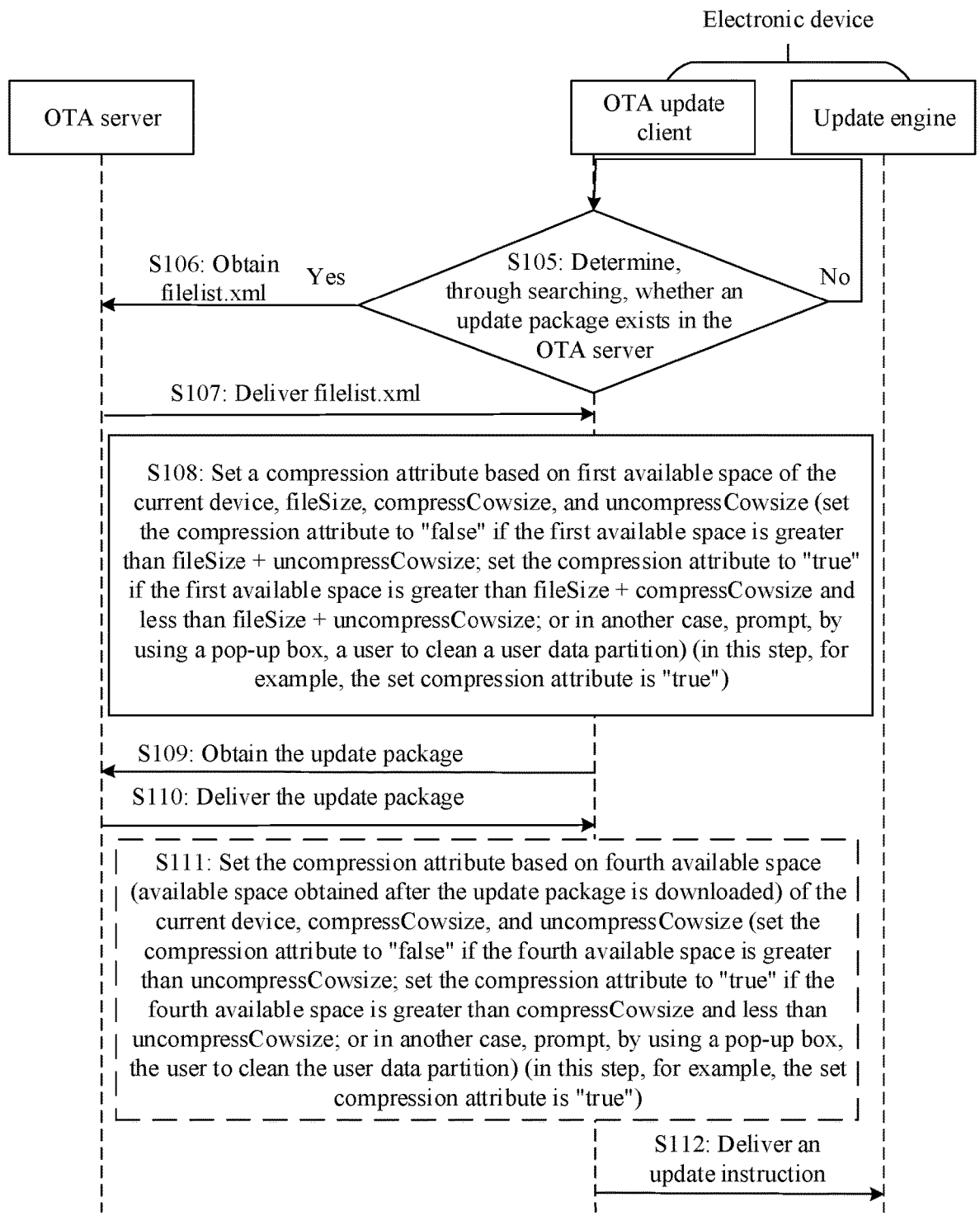
FIG. 8.2

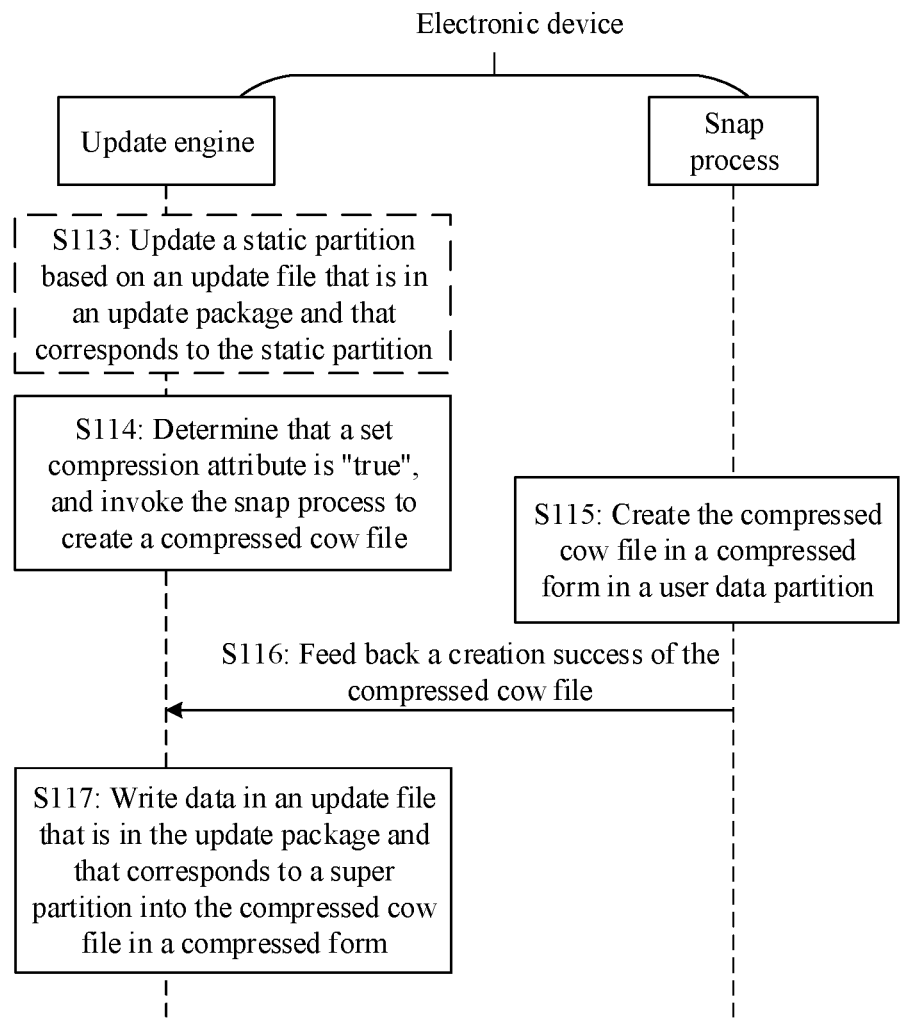
FIG. 8.3

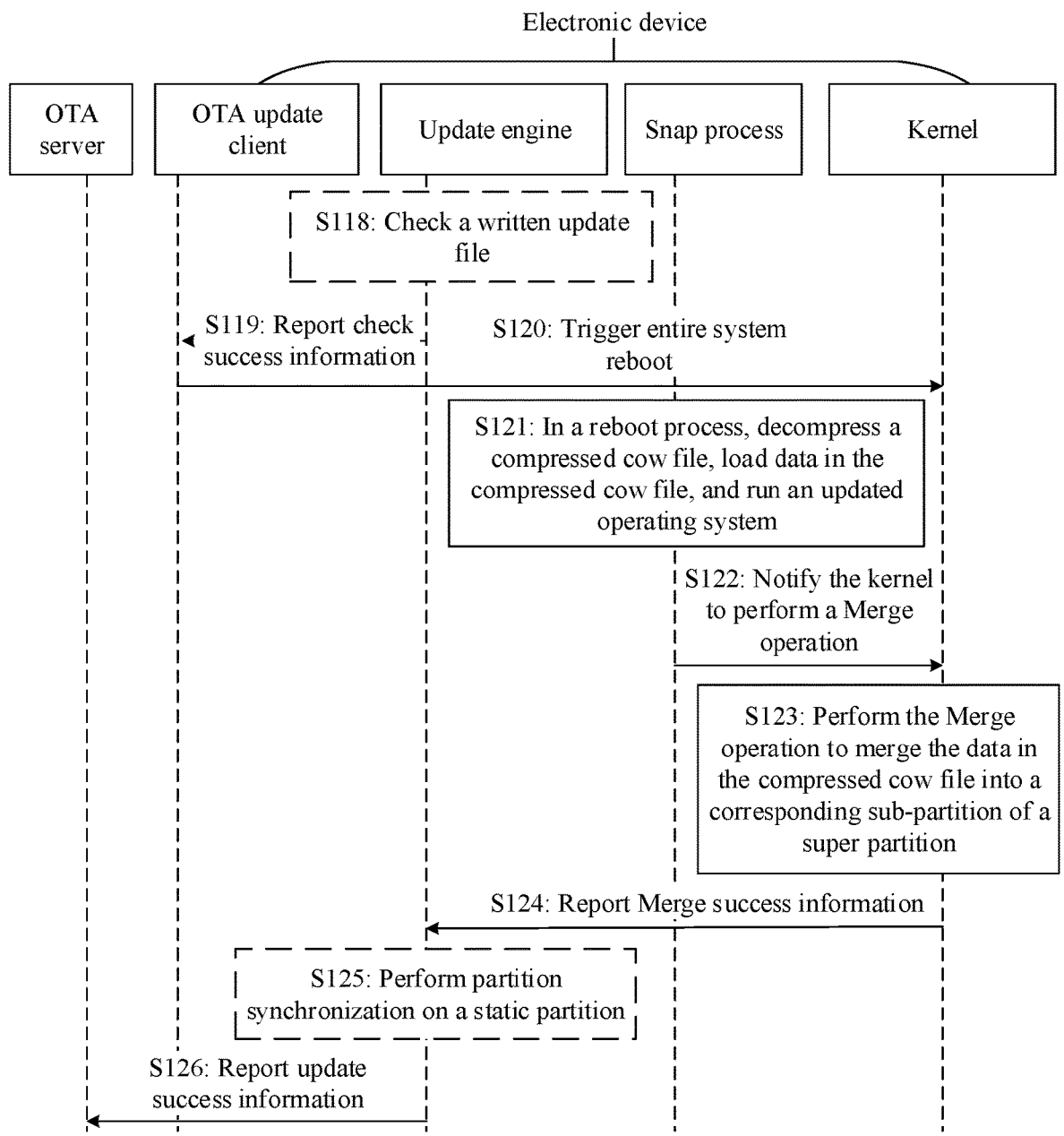
FIG. 8.4

OPERATING SYSTEM UPDATE METHOD, ELECTRONIC DEVICE, AND STORAGE MEDIUM

CROSS-REFERENCE TO RELATED APPLICATIONS

This application is a National Stage of International Application No. PCT/CN2022/139052 filed on Dec. 14, 2022, which claims priority to Chinese Patent Application No. 202210243332.7, filed on Mar. 11, 2022, both of which are incorporated herein by references in their entireties.

TECHNICAL FIELD

This application relates to the field of computer technologies, and in particular, to an operating system update method, an electronic device, and a storage medium.

BACKGROUND

As more applications can be installed on an electronic device, user data has an increasing storage space occupation requirement. At present, to ensure success of operating system updating and also minimize storage space occupied by system data, to reserve more storage space for storing user data, electronic devices using a virtual AB system (Virtual AB) partition structure become increasingly popular.

For the electronic device using the virtual AB system partition structure, because a super partition (Super partition) exists in a form of a single partition, in an operating system update process, the electronic device needs to first write an update file corresponding to the super partition into a user data partition (Userdata partition), and then read the update file from the user data partition and merge the update file into a sub-partition corresponding to the super partition when the electronic device reboots. As a result, in the operating system update process, a relatively large amount of space of the user data partition is occupied, and even an update failure is caused due to insufficient space of the user data partition.

SUMMARY

To resolve the foregoing technical problem, this application provides an operating system update method, an electronic device, and a storage medium. A super-partition update manner is selected based on an available size of space of a user data partition, to ensure, without affecting use by a user, that the electronic device can normally complete operating system updating.

According to a first aspect, this application provides an operating system update method, applied to an electronic device. The electronic device includes a processor and a memory, the memory includes a common partition, a first static partition, a second static partition, a super partition, and a user data partition, the electronic device sequentially loads data in the common partition, data in the first static partition, and data in the super partition after boot, to run a first operating system, and after the first operating system is run, the method further includes: obtaining file list description information corresponding to an update package, where the file list description information indicates a first size of the update package, a second size that is of a first update file in the update package and that is obtained after compression, and a third size that is of the first update file and that exists before compression, and the first update file corresponds to a first sub-partition of the super partition; and creating a first copy-on-write cow file corresponding to the first sub-partition in the user data partition if first available space of the user data partition is greater than a sum of the first size and the third size, where the first available space is available space that is of the user data partition and that exists before the update package is downloaded; or creating a second cow file corresponding to the first sub-partition in the user data partition if first available space of the user data partition is greater than a sum of the first size and the second size and less than the sum of the first size and the third size, where a size of the first cow file is greater than a size of the second cow file. Therefore, a size of a virtual logical partition, namely, a cow file, occupied by a sub-partition of the super partition in the user data partition during current-time operating system updating is determined based on a size of available space of the user data partition, the first size of the update package, and the second size and the third size of the first update file; and then, it is determined, based on the size of the cow file, whether to select a cow file compression function, so that an update manner can be properly selected based on the available space of the user data partition, thereby meeting different user requirements.

According to the first aspect, the size of the first cow file is equal to a value obtained by subtracting second available space and the first size from the first available space, and the second available space is available space that is of the user data partition and that is obtained after the update package is downloaded and the first cow file is created; and the size of the second cow file is equal to a value obtained by subtracting third available space and the first size from the first available space, and the third available space is available space that is of the user data partition and that is obtained after the update package is downloaded and the second cow file is created.

According to either of the first aspect or the foregoing implementation of the first aspect, the creating a first copy-on-write cow file corresponding to the first sub-partition in the user data partition if first available space of the user data partition is greater than a sum of the first size and the third size includes: setting an identifier corresponding to a compression attribute to a first identifier if the first available space of the user data partition is greater than the sum of the first size and the third size, where the first identifier indicates that the first update file is not installed by using the cow compression function; and creating the first cow file corresponding to the first sub-partition in an uncompressed form in the user data partition based on the first identifier.

According to any one of the first aspect or the foregoing implementations of the first aspect, before the creating the first cow file corresponding to the first sub-partition in an uncompressed form in the user data partition based on the first identifier, the method further includes: obtaining the update package; and performing, after obtaining the update package, the step of creating the first cow file corresponding to the first sub-partition in an uncompressed form in the user data partition based on the first identifier.

According to any one of the first aspect or the foregoing implementations of the first aspect, before the performing, after obtaining the update package, the step of creating the first cow file corresponding to the first sub-partition in an uncompressed form in the user data partition based on the first identifier, the method further includes: setting the identifier corresponding to the compression attribute to the first identifier if fourth available space of the user data partition is greater than the third size, where the fourth available space is available space that is of the user data partition and that is obtained after the update package is downloaded; or setting the identifier corresponding to the compression attribute to a second identifier if fourth available space of the user data partition is greater than the second size and less than the third size, where the second identifier indicates that the first update file is installed by using the cow compression function.

According to any one of the first aspect or the foregoing implementations of the first aspect, after the creating the first cow file corresponding to the first sub-partition in an uncompressed form in the user data partition based on the first identifier, the method further includes: writing, in an uncompressed form, data in the first update file into the first cow file that corresponds to the first sub-partition and that is created in the uncompressed form in the user data partition.

According to any one of the first aspect or the foregoing implementations of the first aspect, the creating a second cow file corresponding to the first sub-partition in the user data partition if first available space of the user data partition is greater than a sum of the first size and the second size and less than the sum of the first size and the third size, where a size of the first cow file is greater than a size of the second cow file includes: setting the identifier corresponding to the compression attribute to the second identifier if the first available space of the user data partition is greater than the sum of the first size and the second size and less than the sum of the first size and the third size, where the second identifier indicates that the first update file is installed by using the cow compression function; and creating the second cow file corresponding to the first sub-partition in a compressed form in the user data partition based on the second identifier.

According to any one of the first aspect or the foregoing implementations of the first aspect, before the creating the second cow file corresponding to the first sub-partition in a compressed form in the user data partition based on the second identifier, the method further includes: obtaining the update package; and performing, after obtaining the update package, the step of creating the second cow file corresponding to the first sub-partition in a compressed form in the user data partition based on the second identifier.

According to any one of the first aspect or the foregoing implementations of the first aspect, before the performing, after the obtaining the update package, the step of creating the second cow file corresponding to the first sub-partition in a compressed form in the user data partition based on the second identifier, the method further includes: setting the identifier corresponding to the compression attribute to the first identifier if fourth available space of the user data partition is greater than the third size, where the first identifier indicates that the first update file is not installed by using the cow compression function, and the fourth available space is available space that is of the user data partition and that is obtained after the update package is downloaded; or setting the identifier corresponding to the compression attribute to the second identifier if fourth available space of the user data partition is greater than the second size and less than the third size.

According to any one of the first aspect or the foregoing implementations of the first aspect, after the creating the second cow file corresponding to the first sub-partition in a compressed form in the user data partition based on the second identifier, the method further includes: writing, in a compressed form, the data in the first update file into the second cow file that corresponds to the first sub-partition and that is created in the compressed form in the user data partition.

According to any one of the first aspect or the foregoing implementations of the first aspect, the writing, in a compressed form, the data in the first update file into the second cow file that corresponds to the first sub-partition and that is created in the compressed form in the user data partition includes: removing o from the data in the first update file; and writing data obtained after o is removed into the second cow file that corresponds to the first sub-partition and that is created in the compressed form in the user data partition.

According to any one of the first aspect or the foregoing implementations of the first aspect, the method further includes: if the first available space of the user data partition is greater than the sum of the first size and the third size, the electronic device does not perform a read/write operation other than operating system updating on the user data partition in an operating system update process; or if the first available space of the user data partition is greater than the sum of the first size and the second size and less than the sum of the first size and the third size, the electronic device does not perform a read/write operation other than operating system updating on the user data partition in an operating system update process.

According to any one of the first aspect or the foregoing implementations of the first aspect, the method further includes: if the first available space is less than the sum of the first size and the second size, making a prompt to clean the user data partition.

According to any one of the first aspect or the foregoing implementations of the first aspect, the making a prompt to clean the user data partition includes: determining a first difference between the sum of the first size and the second size and the first available space; and making a prompt to clean at least space of the first difference in the user data partition.

According to any one of the first aspect or the foregoing implementations of the first aspect, the method further includes: making a prompt to clean the user data partition if the fourth available space is less than the second size.

According to any one of the first aspect or the foregoing implementations of the first aspect, the making a prompt to clean the user data partition includes: determining a second difference between the second size and the fourth available space; and making a prompt to clean at least space of the second difference in the user data partition.

According to a second aspect, this application provides an electronic device. The electronic device includes a processor and a memory, the memory includes a common partition, a first static partition, a second static partition, a super partition, and a user data partition, and the electronic device sequentially loads data in the common partition, data in the first static partition, and data in the super partition after boot, to run a first operating system. The memory is coupled to the processor and the memory stores program instructions. When the program instructions are executed by the processor, the electronic device is enabled to execute instructions for the method in any one of the first aspect or the foregoing implementations of the first aspect.

According to a third aspect, this application provides a computer-readable storage medium, configured to store a computer program. When the computer program is run on an electronic device, the electronic device is enabled to execute instructions for the method in any one of the first aspect or the foregoing implementations of the first aspect.

According to a fourth aspect, this application provides a computer program product. The computer program product includes a computer program. When the computer program is run on an electronic device, the electronic device is enabled to execute instructions for the method in any one of the first aspect or the foregoing implementations of the first aspect.

According to a fifth aspect, this application provides a chip. The chip includes a processing circuit, a receiving pin, and a sending pin. The receiving pin, the sending pin, and the processing circuit communicate with each other by using an internal connection channel. The processing circuit executes instructions for the method in any one of the first aspect or the foregoing implementations of the first aspect, to control the receiving pin to receive a signal and control the sending pin to send a signal.

BRIEF DESCRIPTION OF THE DRAWINGS

FIG. 5.1 is an example of a schematic diagram of writing data in an update package into a static partition in an operating system update process;

FIG. 5.2 is an example of a schematic diagram of writing data in an update package into a super partition in an operating system update process;

FIG. 5.3 is an example of a schematic diagram of files included in an update package;

FIG. 6.1 is an example of a schematic diagram of creating a cow file in a user data partition when available space of the user data partition is greater than a sum of an update package and an uncompressed update file corresponding to a super partition;

FIG. 6.2 is an example of a schematic diagram of creating a cow file in a user data partition when available space of the user data partition is less than a sum of an update package and an uncompressed update file corresponding to a super partition and greater than a sum of the update package and a compressed update file corresponding to the super partition;

FIG. 7.1 is an example of a schematic diagram of operations performed during static-partition updating that are performed before and after an electronic device downloads an update package from an OTA server in an operating system update process;

FIG. 7.2 is an example of a schematic diagram of operations performed after an electronic device updates a static partition and before the electronic device updates a super partition in an operating system update process;

FIG. 7.3 is an example of a schematic diagram in which an electronic device writes a first update file into System_COW and checks a dtbo_b sub-partition in an operating system update process;

FIG. 7.4 is an example of a schematic diagram of check performed on System_COW by an electronic device and an interface obtained after the electronic device is rebooted in an operating system update process;

FIG. 7.5 is an example of a schematic diagram in which an electronic device performs a Merge operation and partition synchronization in an operating system update process;

FIG. 7.6 is an example of a schematic diagram in which an electronic device reports an update result to an OTA server after completing partition synchronization in an operating system update process;

FIG. 8.1 is an example of a sequence diagram between a packaging server and an OTA server in an operating system update process;

FIG. 8.2 is an example of a sequence diagram in which an electronic device obtains an update package from an OTA server in an operating system update process;

FIG. 8.3 is an example of a sequence diagram of writing update files into a static partition and a super partition in an operating system update process;

FIG. 8.4 is an example of a sequence diagram of performing operations after writing update files into a static partition and a super partition in an operating system update process;

DETAILED DESCRIPTION OF ILLUSTRATIVE EMBODIMENTS

The following clearly describes technical solutions in embodiments of this application with reference to the accompanying drawings in the embodiments of this application. Apparently, the described embodiments are merely some rather than all of the embodiments of this application. All other embodiments obtained by persons of ordinary skill in the art based on the embodiments of this application without creative efforts shall fall within the protection scope of this application.

In this specification, the term "and/or" is merely used to describe an association relationship between associated objects, and indicates that three relationships may exist. For example, A and/or B may indicate the following three cases: Only A exists, both A and B exist, and only B exists.

The terms "first", "second", and the like in the specification and claims of the embodiments of this application are used to distinguish between different objects, and are not used to describe a specific sequence of the objects. For example, a first target object, a second target object, and the like are used to distinguish between different target objects, but are not used to describe a specific sequence of the target objects.

In the embodiments of this application, words such as "an example" or "for example" are used to represent giving an example, an illustration, or a description. Any embodiment or design solution described as "an example" or "for example" in the embodiments of this application should not be explained as being more preferred or having more advantages than other embodiments or design solutions. Exactly, use of the words "an example" or "for example" is intended to present a related concept in a specific manner.

In description of the embodiments of this application, unless otherwise specified, "a plurality of" means two or more. For example, a plurality of processing units mean two or more processing units, and a plurality of systems mean two or more systems.

For a better understanding of the technical solutions provided in the embodiments of this application, before the technical solutions in the embodiments of this application are described, a hardware structure of an electronic device (such as a mobile phone, a tablet computer, or a PC) to which the embodiments of this application are applicable is first described with reference to the accompanying drawings.

Figure 1:
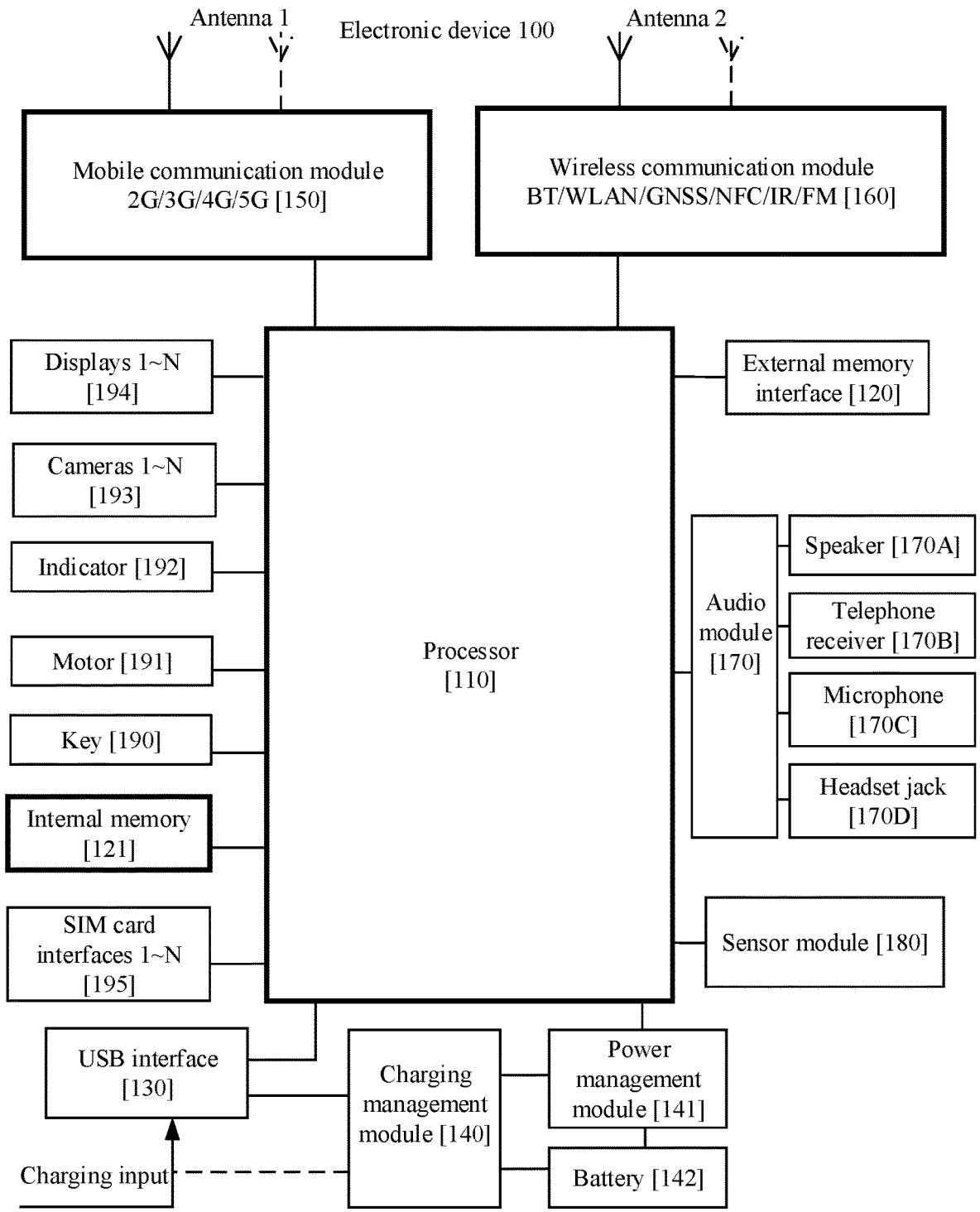
FIG. 1 is an example of a schematic diagram of a hardware structure of an electronic device.

Referring to FIG. 1, an electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a sensor module 180, a key 190, a motor 191, an indicator 192, a camera 193, a display 194, a subscriber identification module (subscriber identification module, SIM) card interface 195, and the like.

For example, the audio module 170 may include a speaker 170A, a telephone receiver 170B, a microphone 170C, and a headset jack 170D.

For example, the sensor module 180 may include a pressure sensor, a gyroscope sensor, a barometric pressure sensor, a magnetic sensor, an acceleration sensor, a distance sensor, an optical proximity sensor, a fingerprint sensor, a temperature sensor, a touch sensor, an ambient light sensor, and a bone conduction sensor.

For example, the key 190 includes a power key (power-on key) and a volume key. The key 190 may be a mechanical key, or may be a touch key. The electronic device 100 may receive key input and generate key signal input related to user settings and function control of the electronic device 100.

In addition, the processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like.

It may be understood that, during specific implementation, different processing units may be separate devices or may be integrated into one or more processors.

In addition, in some implementations, the controller may be a nerve center and a command center of the electronic device 100. The controller may generate an operation control signal based on instruction operation code and a sequence signal, to complete control of instruction fetching and instruction execution.

In addition, a memory in the processor 110 is mainly configured to store instructions and data. In some implementations, the memory in the processor 110 is a cache memory.

In addition, it may be understood that, in an actual application scenario, executable program code that triggers the electronic device 100 to implement various functional applications and data processing is stored in the internal memory 121, and the executable program code includes instructions.

For example, specifically, in the technical solutions provided in the embodiments of this application, boot of the electronic device 100 and updating of an operating system mainly depend on related instructions pre-stored in the internal memory 121, and the processor 110 executes the instructions stored in the internal memory 121, to enable the electronic device 100 to perform the operating system update method provided in the embodiments of this application.

Figure 2:
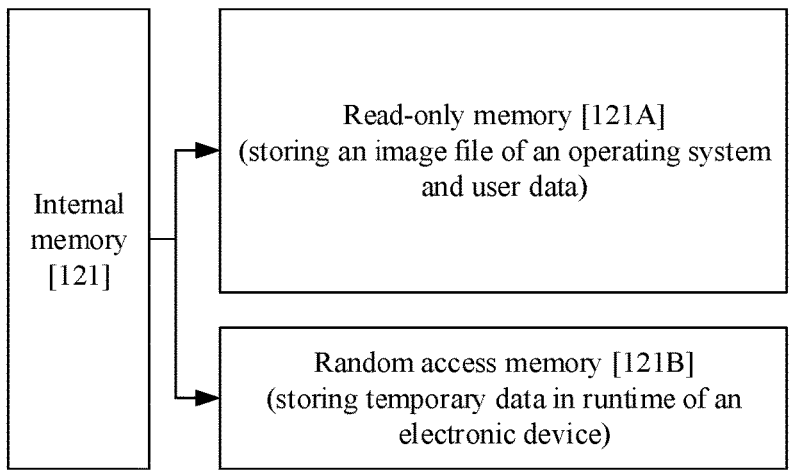
FIG. 2 is an example of a schematic diagram of type division of an internal memory.

For example, referring to FIG. 2, during specific implementation, the internal memory 121 may include a read-only memory 121A and a random access memory 121B. For the read-only memory 121A, three different partition structures, namely, a non-AB system (shown in (1) in FIG. 3), an AB system (shown in (2) in FIG. 3), and a virtual AB system (shown in (3) in FIG. 3), may be further obtained through division.

It may be understood that, specifically, during actual application, the random access memory (Random Access Memory, RAM) is also referred to as a "main memory". Reading/writing can be performed on the random access memory at a very high speed at any time, and the random access memory is usually used as a temporary data storage medium of the operating system or another running program. When the electronic device is powered off, the RAM cannot retain data. In other words, the random access memory 121B usually stores temporary data in runtime of the electronic device. The read-only memory (Read-Only Memory, ROM) may also be referred to as a "nonvolatile memory". Data stored in the read-only memory is usually written in advance before being loaded into an entire system, and is, for example, an image file of the operating system and user data generated when a user uses the electronic device. In a working process of the entire system, only reading can be performed on the ROM, and overwriting cannot be quickly and conveniently performed on the ROM like the RAM. Therefore, the data stored in the ROM is stable, and the stored data does not change after power-off. In conclusion, a largest difference between the RAM and the ROM is that data stored in the RAM automatically disappears after power-off, while data stored in the ROM does not automatically disappear after power-off and can be stored for long time after power-off.

In addition, it should be noted that in a current operating system update process, when update files in an update package downloaded from an over-the-air (Over-the-Air, OTA) server to a user data partition (located in the read-only memory 121A) in the electronic device are decompressed to a corresponding static partition and super partition, the update files are cached by using a kernel of the random access memory 121B, to implement quick reading/writing of the update files.

In addition, specifically, during actual application, the read-only memory 121A may be, for example, a disk storage device, a flash memory device, or a universal flash storage (universal flash storage, UFS). The random access memory 121B may be, for example, a high-speed random access memory.

In addition, it should be noted that, during specific implementation, the read-only memory 121A may include a program storage area and a data storage area. The program storage area may store the operating system, an application required by at least one function (such as a sound playing function or an image playing function), and the like. The data storage area may store data (such as audio data or a phone book) created in a use process of the electronic device 100.

For example, specifically, in the technical solutions provided in the embodiments of this application, the program storage area may be, for example, a common partition (Common), a static partition (Static partition), and a super partition (Super). Specifically, in the technical solutions provided in the embodiments of this application, the data storage area may be, for example, a user data partition (Userdata).

Figure 3:
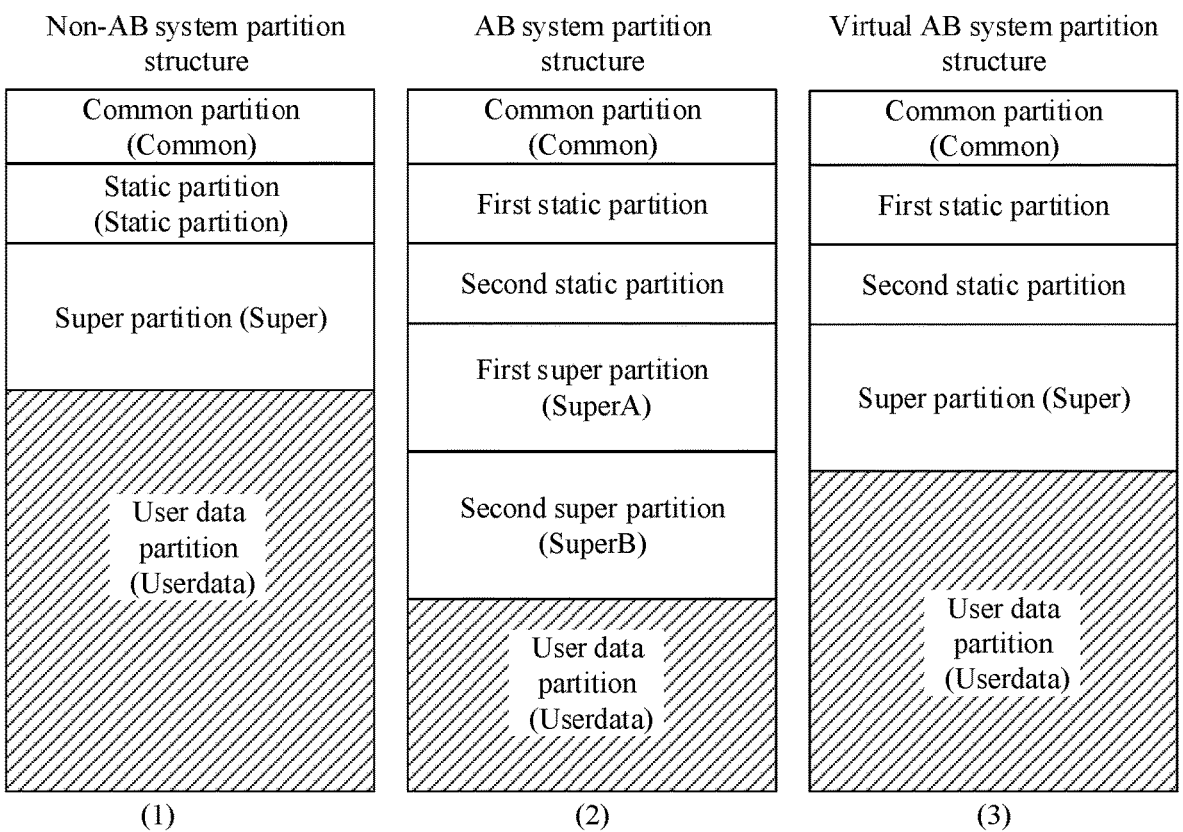
FIG. 3 is an example of a schematic diagram of a non-AB system partition structure, an AB system partition structure, and a virtual AB system partition structure.

Still referring to FIG. 3, a partition structure of the internal memory 121 of the electronic device 100 may be, for example, the non-AB system, the AB system, or the virtual AB system. Specifically, based on characteristics of the foregoing four types of partitions (the common partition, the static partition, the super partition, and the user data partition), during operating system updating, partitions that do not need to be updated, for example, the common partition and the user data partition, are all single partitions regardless of the non-AB system, the AB system, or the virtual AB system, but a partition that needs to be updated is different.

For example, when the operating system is updated in the non-AB system, another function of the electronic device cannot be used in an update process, and the electronic device can stay only in an update interface of the non-AB system, and can enter a user interface for normal use only after operating system updating is completed and the electronic device is rebooted. Therefore, in the non-AB system, the static partition and the super partition are also single partitions. For details, refer to (1) in FIG. 3. In this way, space occupation for the memory can be reduced, to reserve more space for the user data partition.

For example, the AB system is intended to enable a user to randomly return to a home screen of the electronic device in a process in which the electronic device updates the operating system, to cause no impact on use of the electronic device. Therefore, in the AB system, the static partition and the super partition are dual partitions. For details, refer to (2) in FIG. 3. The static partition may be divided into, for example, a first static partition and a second static partition, and the super partition may be divided into, for example, a first super partition (SuperA) and a second super partition (SuperB). In this partitioning manner, the electronic device can randomly return to the home screen of the electronic device in the process in which the electronic device updates the operating system, but relatively large space of the memory is occupied, and consequently space available to the user data partition is greatly reduced.

For example, the virtual AB system combines the advantages of the non-AB system and the AB system. The static partition that stores a relatively small file, in other words, occupies relatively small storage space, is divided into a first static partition and a second static partition, and the super partition that stores a relatively large file, in other words, occupies relatively large storage space is a single partition. For details, refer to (3) in FIG. 3.

For example, a partition structure of the read-only memory 121A is the virtual AB system partition structure. Specifically, during actual application, partition deployment information of the read-only memory 121A in the electronic device may be described by using a partition table shown in Table 1.

TABLE 1

| Partition | Name (name) | Size (size) | Start address-end address (start address-end address) |
|---|---|---|---|
| 0 | GPT (general electronic device area) | | 0x00000000-0x000000FF |
| 1 | x-loader | 256 KB | 0x00000100-0x0000XXX |
| 2 | Bootloader (bootloader) | 600 KB | 0x00000XXX-0x0000XXXX |
| 3 | Boot (boot) | 32 MB | 0x0000XXXX-0x0000XXXX |
| 4 | First static partition | 128 MB | 0x0000XXXX-0x0000XXXX |
| 5 | Second static partition | 128M | 0x0000XXXX-0x0000XXXX |
| 5 | Super (super partition) | 8 GB | 0x0000XXXX-0x0000XXXX |
| 6 | Userdata (user data partition) | 128 GB | 0x0000XXXX-0x0000XXXX |

In this way, a start address and a size of each partition are defined by using the partition table, so that a corresponding partition size can be adjusted for different hardware based on a requirement.

In addition, it should be noted that, except a specially reserved partition, each partition substantially has a corresponding image (image) file thereof. The image file is compiled by using software code, and various functional files and configurations related to boot or a running process of the electronic device are integrated in the image file. Without the image file, the electronic device cannot run. A complete system version includes many images such as a partition table image gpt.img, a boot related image (xloader.img or boot.img), a system image super.img (integrated with an android system kernel), and user data image userdata.img (used to store user data).

It should be understood that the foregoing description is merely an example provided to better understand the technical solution of this embodiment, and is not used as a unique limitation on this embodiment.

In other words, during actual application, the partitions recorded in the partition table may be set through division based on an actual service requirement.

In addition, distribution statuses of the partitions existing in a form of dual partitions in the memory in the AB system partition structure and the virtual AB system partition structure are not limited to patterns shown in (2) in FIGS. 3 and (3) in FIG. 3. During actual application, a location of each partition is determined based on an assigned start address and end address.

The hardware structure of the electronic device 100 is not further described. It should be understood that the electronic device 100 shown in FIG. 1 is only an example. During specific implementation, the electronic device 100 may have more or fewer components than those shown in the figure, may combine two or more components, or may have a different component configuration. The various components shown in FIG. 1 may be implemented in hardware, software, or a combination of hardware and software including one or more signal processing and/or application-specific integrated circuits.

In addition, it should be noted that in an actual application scenario, with development of over-the-air technology (Over-the-Air Technology, OTA), OTA updating for implementing remote version updating on an electronic device by using a wireless network interface of the electronic device becomes more popular. With reference to an actual service scenario, for ease of description of the operating system update solutions described in the embodiments of this application, the following describes, with reference to FIG. 4 by using an OTA update scenario as an example, interaction between a packaging server, an OTA server, and an electronic device in the operating system update solutions provided in the embodiments of this application.

Figure 4:
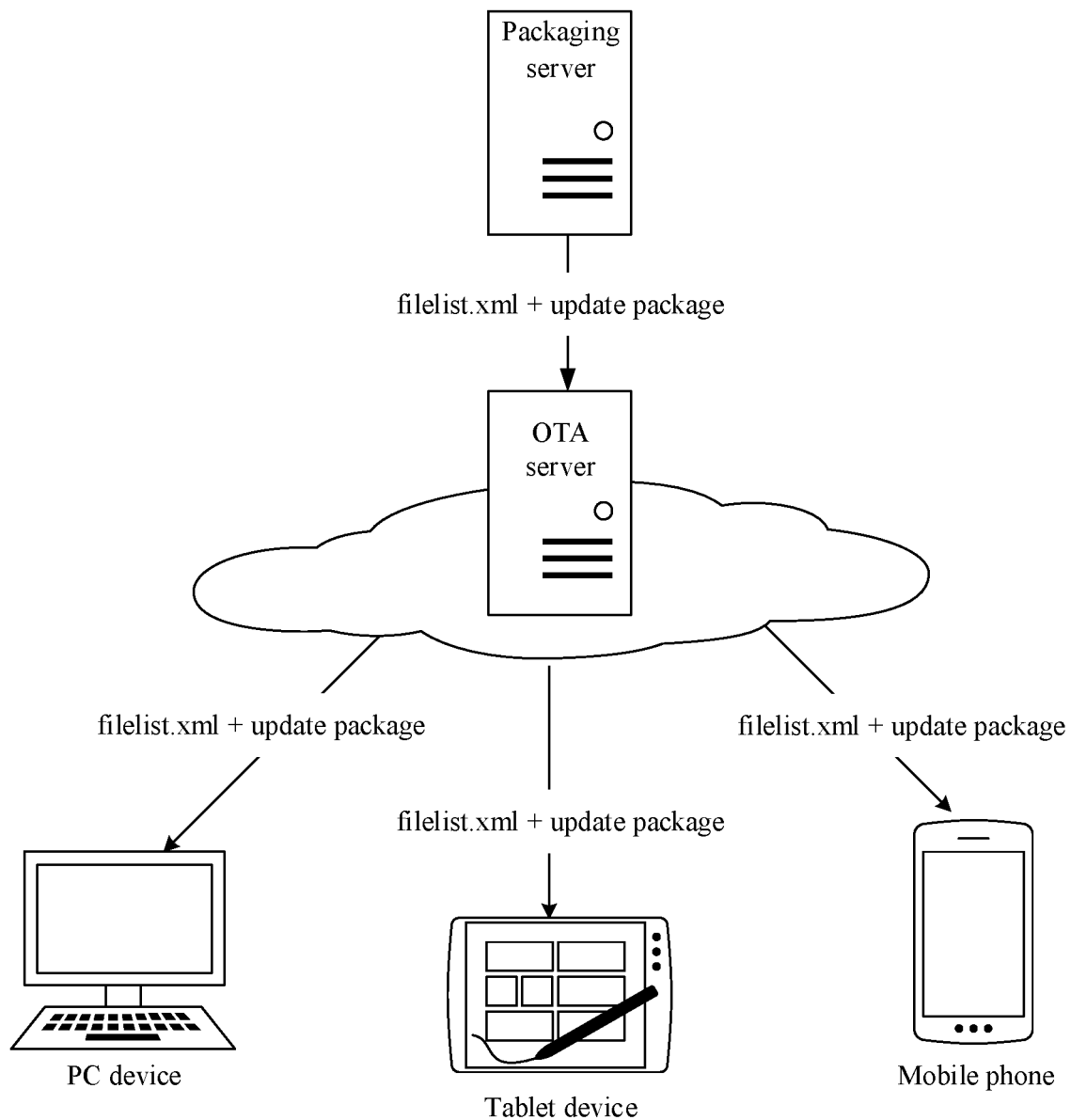
FIG. 4 is an example of a schematic diagram of interaction between a packaging server, an OTA server, and an electronic device in an operating system update process.

For example, referring to FIG. 4, an update package for updating an operating system of the electronic device (for example, a PC device, a tablet device, or a mobile phone in FIG. 4) is produced by a packaging server based on a version image, and the produced update package is uploaded by the packaging server to the OTA server and is centrally managed by the OTA server, to be actively pushed to an accessed electronic device or sent to a corresponding electronic device based on a request of the accessed electronic device.

For example, the update package produced by the packaging server based on the version image may include a boot related image (for example, xloader.img or boot.img) and a system image (for example, super.img). Images are not listed herein one by one. This is not limited in this embodiment.

In addition, in the technical solution provided in this embodiment, to ensure that operating system updating can be implemented regardless of whether available space of a user data partition is sufficient or insufficient, when producing the update package, the packaging server further produces file list description information (hereinafter referred to as filelist.xml) for describing the update package, and when uploading the update package to the OTA server, the packaging server also uploads filelist.xml for describing the update package to the OTA server for management.

It should be noted that, in the technical solution provided in this embodiment, filelist.xml produced by the packaging server indicates at least a first size (hereinafter referred to as fileSize) of the update package, a second size (hereinafter referred to as compressCowsize) that is of an update file for updating a super partition and that is obtained after compression, and a third size (hereinafter referred to as uncompressCowsize) that is of the update file for updating the super partition and that exists before compression.

Still referring to FIG. 4, after obtaining the update package from the OTA server and updating the operating system, the electronic device reports a current-time update result to the OTA server, so that the OTA server learns whether current-time operating system updating of the electronic device succeeds.

In addition, it should be noted that during actual application, in an update failure case, the update result reported by the electronic device to the OTA server may further include update failure log information, to help quickly locate a cause of an operating system update failure.

The following describes, with reference to FIG. 5.1 to FIG. 5.3, a process in which the electronic device downloads the update package from the OTA server and updates the operating system based on the update package, namely, a process in which the electronic device writes data in the update package into a corresponding sub-partition of a static partition and a corresponding sub-partition of the super partition.

For example, referring to FIG. 5.1 and FIG. 5.2, the update package downloaded by the electronic device from the OTA server is specifically stored in the user data partition. In the process of writing the data in the update package into the corresponding sub-partition of the static partition and the corresponding sub-partition of the super partition, a random access memory RAM reads the data in the update package stored in the user data partition to the RAM, in other words, performs step (1) in FIG. 5.1. Then, the RAM writes data for updating the static partition into the corresponding sub-partition of the static partition, in other words, performs step (2) in FIG. 5.1, and writes data for updating the super partition into the corresponding sub-partition of the super partition, in other words, performs step (3) in FIG. 5.2.

For example, in FIG. 5.1, the electronic device currently boots from a first static partition in a boot sequence. When a sub-partition that is in the static partition and that needs to be updated is a dtbo sub-partition, the RAM writes data for updating the dtbo sub-partition into a dtbo_b sub-partition in a second static partition that is currently a backup partition.

For example, in FIG. 5.2, if a sub-partition that is of the super partition and that needs to be updated is a System sub-partition, the RAM writes data that is in the update package and that corresponds to the System sub-partition into a cow file that is in the user data partition and that corresponds to the System sub-partition, namely, System_COW in the user data partition in FIG. 5.2.

The following describes, with reference to FIG. 5.3, files usually included in the update package.

For example, during actual application, the update package usually includes a key signature verification file for storing key signature verification data, a version description file of the update package, payload.bin (an Android OTA image packaging file, including image files such as system.img, boot.img, and recovery.img), and an attribute file for describing payload.bin.

Further, payload.bin may be further divided into two parts: Metadata and Data. Metadata is a description of Data and is used to indicate specific locations of update data of different partitions in Data. In other words, Metadata is used to play a directory index role and also play a signature verification role, and Data carries the update data for updating the sub-partition of the static partition and the sub-partition of the super partition.

For an implementation of locating data of each partition in Data based on Metadata, refer to an existing standard. Details are not described herein.

Specifically, in the operating system update solutions provided in the embodiments of this application, to enable an update manner to match the electronic device, to take user experience into consideration and also ensure that the operating system can be quickly and normally updated, the electronic device performs determining on the available space of the user data partition when updating the operating system, and sets a compression attribute, in other words, performs setting on whether to use a cow compression function, based on a determining result.

It should be noted that, in the technical solution provided in this embodiment, when determining is performed on the available space and the compression attribute is set based on the determining result, specifically, determining is performed based on the available space of the user data partition and fileSize, compressCowsize, and uncompressCowsize in the foregoing filelist.xml, and then setting is performed, based on the determining result, on whether to use the cow compression function.

For example, if filelist.xml records that fileSize of the update package is 506 M, compressCowsize that is of an update file and that corresponds to the System sub-partition of the super partition is 1.0 G, and uncompressCowsize that is of the update file and that corresponds to the System sub-partition of the super partition is 8.7 G, referring to FIG. 6.1, when the available space of the user data partition is 10.0 G, because available space (10.0 G)>fileSize (506

M)+uncompressCowsize (8.7 G), a compression attribute that is set in this case is that the cow compression function is not used, to be specific, System_COW that corresponds to the System sub-partition and that is subsequently created in the user data partition after the update package is downloaded is created in an uncompressed form, and when writing the data that is in the update package and that corresponds to the System sub-partition into uncompressed System_COW, the RAM can directly write the data without performing compression processing on the data.

For example, if filelist.xml records that fileSize of the update package is 506 M, compressCowsize that is of an update file and that corresponds to the System sub-partition of the super partition is 1.0 G, and uncompressCowsize that is of the update file and that corresponds to the System sub-partition of the super partition is 8.7 G, referring to FIG. 6.2, when the available space of the user data partition is 2.0 G, because fileSize (506 M)+uncompressCowsize (8.7 G)>available space (2.0 G)>fileSize (506 M)+compress-Cowsize (1.0 G), a compression attribute that is set in this case is that the cow compression function is used, to be specific, System_COW that corresponds to the System sub-partition and that is subsequently created in the user data partition after the update package is downloaded is created in a compressed form, and when writing the data that is in the update package and that corresponds to the System sub-partition into compressed System_COW, the RAM needs to perform compression processing on the data.

It should be noted that during actual application, if the set compression attribute is that the cow compression function is used, when writing the data that is in the update package and that corresponds to the System sub-partition into compressed System_COW, the RAM may select a compression algorithm based on a service requirement, to perform compression processing on the data. Selection of the compression algorithm is not limited in this embodiment.

For example, before updating an operating system, an electronic device sequentially loads data in a common partition, data in a first static partition, and data in a super partition, so that the electronic device runs a first operating system (a version SlotA (v1.0) existing before operating system updating). The operating system update solutions provided in the embodiments of this application are described with reference to FIG. 7.1 to FIG. 7.6 by using an example in which a dtbo sub-partition of a static partition and a System sub-partition of the super partition need to be updated during current-time system updating.

Referring to FIG. 7.1, when the operating system needs to be updated, the electronic device first performs step (1) in FIG. 7.1: Obtain a first size of an update package, a second size that is of a first update file in the update package and that is obtained after compression, and a third size that is of the first update file and that exists before compression from an OTA server, where the first update file corresponds to the System sub-partition of the super partition.

Then, the electronic device performs step (2) in FIG. 7.1: If first available space of a user data partition is greater than a sum of the first size and the third size, set a compression attribute to self.virtual_ab.compression.enabled=false (a cow compression function is not used), and download the update package; if first available space of the user data partition is greater than a sum of the first size and the second size and less than the sum of the first size and the third size, set a compression attribute to self.virtual_ab.compression.enabled=true (the cow compression function is used), and download the update package; or if first available space of the user data partition is less than the sum of the first size and the second size, prompt, by using a pop-up box in a UI interface, a user to clean user data space.

For example, in some implementations, self.virtual_ab.compression.enabled="true" may be set to indicate that the copy-on-write (Copy-On-Write, COW) file compression function is used, and self.virtual_ab.compression.enabled="false" may be set to indicate that the cow compression function is not used.

For example, when self.virtual_ab.compression.enabled="true", when an update file of a sub-partition of the super partition is written into the user data partition, it is necessary to first create a corresponding cow file (hereinafter referred to as a compressed cow file) in the user data partition in a compressed form, and then write the update file corresponding to the sub-partition of the super partition into the compressed cow file in a form of a compressed file. In other words, the update file corresponding to the sub-partition of the super partition is stored in the user data partition by using the cow file in the compressed form.

For example, when self.virtual_ab.compression.enabled="false", when an update file of a sub-partition of the super partition is written into the user data partition, it is necessary to first create a corresponding cow file (hereinafter referred to as an uncompressed cow file) in the user data partition in an uncompressed form, and then directly write the update file corresponding to the sub-partition of the super partition into the uncompressed cow file. In other words, the update file corresponding to the sub-partition of the super partition is stored in the user data partition by using the cow file in the uncompressed form.

For example, in some implementations, when a prompt that current first available space of the electronic device is insufficient and the user data space needs to be cleaned is made to the user by using the pop-up box, a prompt for a size of least space that needs to be cleaned may also be made to the user, to ensure that the update package can be successfully downloaded when operating system updating is triggered again.

For example, in some implementations, the user data space that the user is prompted, by using the pop-up box, to clean is at least the sum of the first size and the second size.

For example, in some implementations, if the current first available space of the electronic device is insufficient, after the user is prompted, by using the pop-up box, to clean the user data space, the electronic device may automatically detect, after a preset period, whether current first available space is greater than the sum of the first size and the third size, or is greater than the sum of the first size and the second size and less than the sum of the first size and the third size, and then determine, based on a detection result, whether to download the update package from the OTA server, in other words, re-perform step (2) in FIG. 7.1.

For example, in some other implementations, if the current first available space of the electronic device is insufficient, after the user is prompted, by using the pop-up box, to clean the user data space, re-execution of step (2) in FIG. 7.1 may be actively triggered by the user. For example, the user actively clicks a control for updating the operating system.

It should be understood that the foregoing description is merely an example provided to better understand the technical solution of this embodiment, and is not used as a unique limitation on this embodiment.

For ease of description of the operating system update solutions provided in this application, in step (2) in FIG. 7.1, for example, the first available space of the user data partition is greater than the sum of the first size and the third size, in other words, the set compression attribute is that the cow compression function is not used.

Herein, it should be noted that the update package downloaded by the electronic device from the OTA server is specifically stored in the user data partition, and is not shown in the user data partition in this embodiment.

Next, after downloading the update package from the OTA server, the electronic device performs step (3) in FIG. 7.1: Write data in a second update file that is in the update package and that corresponds to the dtbo sub-partition of the static partition into a dtbo_b sub-partition of a second static partition.

For example, after the data in the second update file is written into the dtbo_b sub-partition of the second static partition, a version of the dtbo_b sub-partition changes from dtbo_b (1.0) shown in FIG. 7.1 to dtbo_b (2.0) shown in FIG. 7.2.

It may be understood that during actual application, if the update package does not include the second update file, in other words, the sub-partition of the static partition does not need to be updated, step (3) in FIG. 7.1 does not need to be performed.

Then, referring to FIG. 7.2, for example, after the electronic device writes the data in the second update file into the dtbo_b sub-partition of the second static partition, in other words, updates the static partition, to avoid a case in which another file occupies available space of the electronic device in a process of downloading the update package, and consequently space required for updating the super partition is insufficient and then updating cannot be completed, the electronic device further performs one time of space determining operation again, in other words, performs step (4) in FIG. 7.2: If fourth available space (available space obtained after the update package is downloaded) of the user data partition is greater than the third size, set the compression attribute to self.virtual_ab.compression.enabled=false; if fourth available space of the user data partition is greater than the second size and less than the third size, set the compression attribute to self.virtual_ab.compression.enabled=true; or if fourth available space of the user data partition is less than the second size, prompt, by using a pop-up box in a UI interface, the user to clean user data space.

For example, in some implementations, the user data space that the user is prompted, by using the pop-up box, to clean is at least the second size.

For example, in some implementations, if current fourth available space of the electronic device is insufficient, after the user is prompted, by using the pop-up box, to clean the user data space, the electronic device may automatically detect, after a preset period, whether current fourth available space is greater than the third size, or is greater than the second size and less than the third size, and then determine, based on a detection result, whether to continue updating, in other words, perform step (5) in FIG. 7.2, or continue updating after detecting a trigger operation of the user through listening. For example, the user actively clicks a control for updating the operating system.

For example, in some other implementations, when the electronic device re-starts operating system updating after determining that second user data space obtained after the user performs cleaning is greater than the third size, or is less than the third size and greater than the second size, the electronic device may re-download the update package from the OTA server, and then sequentially update the sub-partition of the static partition and the sub-partition of the super partition, to prevent data that has been written from being lost or abnormal because the user cleans the user data partition after an update operation is interrupted.

It should be understood that the foregoing description is merely an example provided to better understand the technical solution of this embodiment, and is not used as a unique limitation on this embodiment.

For ease of description of the operating system update solutions provided in this application, in step (4) in FIG. 7.2, for example, the fourth available space of the user data partition is greater than the second size and less than the third size, in other words, a compression attribute that is reset after second-time space determining is that the cow compression function is used.

It may be understood that, it may be determined, based on a service requirement, whether the second-time space determining operation on the user data partition in the foregoing step (4) needs to be performed. This not limited in this application.

In addition, it should be noted that during actual application, the operation in the foregoing step (4) may be performed before step (3), in other words, a sequence of step (3) and step (4) may not be limited. Herein, for example, step (4) is performed after step (3) is performed.

Then, after completing step (4) in FIG. 7.2, the electronic device performs step (5) in FIG. 7.2: Create a cow file (compressed System_COW) corresponding to the System sub-partition in a compressed form in the user data partition.

It may be understood that compressed System_COW created in this case is an empty cow file, in other words, no data has been written in the file yet.

Then, referring to FIG. 7.3, for example, after creating compressed System_COW corresponding to the System sub-partition in the compressed form, the electronic device performs step (6) in FIG. 7.3: Write, in a compressed form, data in the first update file into compressed System_COW created in the compressed form.

For example, after the data in the first update file is written, in the compressed form, into compressed System_COW created in the compressed form, a version of compressed System_COW changes from compressed System_COW shown in FIG. 7.2 to compressed System_COW (2.0) shown in FIG. 7.3.

In addition, it should be noted that after operations of writing update files in the update package into corresponding sub-partitions are completed, to be specific, the second update file is written into the dtbo_b sub-partition and the first update file is written into compressedSystem_COW in the compressed form, the sub-partitions for which the write operations are completed need to be checked.

It may be understood that, according to an existing protocol standard, the static partition needs to be first checked, and the super partition needs to be checked after check on the static partition succeeds. If check on the static partition fails, subsequent operations are directly not performed, and update failure information is reported to the OTA server. Therefore, to check the sub-partitions for which the write operations are completed, the electronic device first performs step (7) in FIG. 7.3: Check the dtbo_b sub-partition, in other words, check a sub-partition that is of the static partition and for which a write operation is completed. For ease of description of the operating system update solutions provided in this application, for example, check on the dtbo_b sub-partition succeeds.

Then, referring to FIG. 7.4, for example, the electronic device performs step (8) in FIG. 7.4: After check on the dtbo_b sub-partition succeeds, check content in compressed System_COW. For ease of description of the operating system update solutions provided in this application, for example, check on compressed System_COW succeeds.

Correspondingly, after check on compressed System_COW succeeds, the electronic device performs step (9) in FIG. 7.5: After check on compressed System_COW succeeds, reboot the electronic device.

It may be understood that during actual application, after the update files in the update package are written into the corresponding sub-partitions and check succeeds, the electronic device may be directly triggered to enter entire system reboot, or the electronic device may enter entire system reboot after a delay.

For example, for a condition of entering entire system reboot after a delay, in some implementations, the electronic device may automatically trigger entire system reboot when the electronic device is idle, to be specific, neither the electronic device is used by the user nor an application is occupied. In some other implementations, the user may manually trigger, based on a requirement, the electronic device to enter entire system reboot.

In addition, it should be noted that, if the electronic device sequentially loads, before updating the operating system, the data in the common partition, the data in the first static partition, and the data in the super partition after boot, and runs a first operating system (a version existing before the operating system is updated), the electronic device sequentially loads the data in the common partition, data in the second static partition, the data in the super partition, and data in the compressed System_COW file in the user data partition after reboot, so that the electronic device runs a second operating system (a version SlotB (v2.0) obtained after the operating system is updated).

Then, after running the second operating system after reboot, the electronic device performs step (10) in FIG. 7.6: Merge the content in the compressed System_COW file into the System sub-partition.

For example, after the Merge operation is completed, the System sub-partition changes from System (1.0) shown in a virtual AB system partition structure on a left side in FIG. 7.5 to System (2.0) shown in a virtual AB system partition structure on a right side in FIG. 7.5.

Then, after completing the Merge operation, the electronic device further performs step (11) in FIG. 7.6: Synchronize data in the dtbo_b sub-partition to a dtbo_a sub-partition, in other words, perform a partition synchronization operation on the static partition. Specifically, data in a static partition that is updated in a current-time operating system update process is synchronized to an un-updated static partition.

For example, when a file in the dtbo_b sub-partition of the second static partition is updated from a 1.0 version to a 2.0 version in current-time operating system updating, after completing the Merge operation, the electronic device copies the file in the dtbo_b sub-partition to the dtbo_a sub-partition of the first static partition, to synchronize the two sub-partitions.

For example, after partition synchronization is completed, the dtbo_a sub-partition changes from dtbo_a (1.0) shown in FIG. 7.5 to dtbo_a (2.0) shown in FIG. 7.6.

Then, after completing the partition synchronization operation, the electronic device performs step (12) in FIG. 7.6: Report an update result to the OTA server.

It may be understood that during actual application, when current-time operating system updating fails because any one of the foregoing steps (3) to (11) is abnormal, the electronic device interrupts a subsequent update operation and reports an update result to the OTA server.

For example, if updating succeeds, the update result reported by the electronic device to the OTA server is content indicating that current-time operating system updating succeeds; otherwise, the update result reported by the electronic device to the OTA server is content indicating that current-time operating system updating fails.

In addition, it should be understood that the foregoing description is merely an example provided to better understand the technical solution of this embodiment, and is not used as a unique limitation on this embodiment.

In addition, it should be noted that the letters corresponding to the foregoing partitions may not be case-sensitive during actual application. This is not limited in this application.

For a better understanding of the operating system update solutions provided in this application, the following describes, in detail with reference to FIG. 8.1 to FIG. 8.4, a process in which a packaging server produces an update package, and an electronic device obtains the update package produced by the packaging server from an OTA server and updates an operating system.

Before the operating system update solutions provided in this application are described with reference to FIG. 8.1 to FIG. 8.4, functional units/modules/applications involved in a process in which the electronic device updates the operating system are first described. For ease of description, in this embodiment, for example, the operating system used by the electronic device is an Android system. For example, in some implementations, the update package may be obtained by an OTA update client (OTA Update Client, OUC) from the OTA server.

It should be noted that the OUC described in this embodiment is specifically an application that is installed in an application layer (Application) of the electronic device and that is used for operating system update management.

In addition, after obtaining the update package from the OTA server, the OUC delivers the obtained update package to an update engine (update_engine) in the electronic device, update_engine completes static-partition updating, and update_engine and a snapshot process (snap process) complete super-partition updating.

Then, after update_engine and the snapshot process complete installation (updating) of an update file in the update package, the OUC triggers the electronic device to enter entire system reboot. After the electronic device runs an updated operating system after reboot, a kernel (kernel) performs a Merge operation to merge data in a cow file in a user data partition into a corresponding sub-partition of a super partition, and update_engine performs partition synchronization on a static partition.

In addition, it may be understood that in some other implementations, operating system updating may be completed by using a portal provided by a setting application installed in the application layer. This is not limited in this embodiment.

For example, referring to FIG. 8.1 to FIG. 8.4, the operating system update solutions provided in this application include the following steps.

S101: Produce the update package based on a version image.

Specifically, during actual application, the update package produced by the packaging server may be produced as a differential update package or a full update package based on a service requirement.

For example, for production of the differential update package, a relatively small boot-related image file is fully packaged to the update package, and a full coverage manner is used at the time of updating. For a relatively large image file, for example, super.img, to reduce a size of the update package, a difference of each logical partition image in super.img of a new version and super.img of an old version is extracted by using a specific differential algorithm, and then an independent patch (patch) file is generated and packaged to the update package. At the time of operating system updating, the patch file in the update package is combined into super.img of the old version in the super partition of the electronic device by using a specific differential algorithm, so that super.img of the new version can be generated to complete updating super.img of the old version to super.img of the new version.

For production of the full package, specifically, all image files in a new version are fully packaged to the update package, in other words, there is no independent patch file.

Specifically, during actual application, for production of the differential update package and the full update package, refer to an existing standard. This is not described in this embodiment.

S102: Calculate a size fileSize of the update package, a size compressCowsize that is of an update file of the super partition in the update package and that is obtained after compression, and a size uncompressCowsize that is of the update file of the super partition and that exists before compression (prior to compression), and add fileSize, compressCowsize, and uncompressCowsize to filelist.xml corresponding to the update package.

To be specific, in this embodiment, when producing the update package, the packaging server adds both compressCowsize and uncompressCowsize that correspond to the update file for updating a sub-partition of the super partition and the size fileSize of the update package to filelist.xml corresponding to the update package, so that the electronic device can determine, based on content recorded in filelist.xml and current available space of the user data partition, an installation manner used to install the update file corresponding to the sub-partition of the super partition.

It may be understood that during actual application, in addition to fileSize, compressCowsize, and uncompressCowsize, filelist.xml further includes other parameter information required in an operating system update process, such as "<support>", "<payloadOffset>", "<fileHash>", "<metadataHash>", "<metadataSize>", "<powerWash>", "<switchSlotOnReboot>", and "<runPostInstall>". Parameters are not listed herein one by one. This is not limited in this embodiment, either.

It should be noted that, during actual application, the foregoing fields appearing in filelist.xml usually appear in pairs, to be specific, "</support>", "</payloadOffset>", "</fileHash>", "</metadataHash>", "</metadataSize>", "</powerWash>", "</switchSlotOnReboot>", and "</runPostInstall>" are further included.

Content between "<support>" and "</support>" is used to indicate whether a virtual AB system partition structure is supported, where "0" indicates that the virtual AB system partition structure is not supported, and "1" indicates that the virtual AB system partition structure is supported. Content between <payloadOffset> and "</payloadOffset>" is used to indicate a start location of payload.bin. Content between "<fileHash>" and "</fileHash>" is used to check a file body in payload.bin. Content between "<metadataHash>" and "</metadataHash>" is used to check file metadata in payload.bin. Content between "<metadataSize>" and "</metadataSize>" is used to indicate a size of the file metadata in payload.bin. Content between "<powerWash>" and "</powerWash>" is used to indicate whether an update file is restored to factory settings after updating, where "0" indicates that the update file is restored to the factory settings after updating, and "1" indicates that the update file is not restored to the factory settings after updating. Content between "<switchSlotOnReboot>" and "</switchSlotOnReboot>" indicates whether a static partition is switched after the update package is installed and before the electronic device reboots, where "0" indicates that the static partition is not switched after the update package is installed and before the electronic device reboots, and "1" indicates that the static partition is switched after the update package is installed and before the electronic device reboots. Content between "<runPostInstall>" and "</runPostInstall>" indicates whether steps of a post-install script program (post-install) are performed, where "0" indicates that the steps of post-install are not performed, and "1" indicates that the steps of post-install are performed.

For example, the steps of post-install may be, for example, obtaining metadata partition status data and switching the static partition.

For example, for ease of understanding, the following gives a type of filelist.xml:

<Virtual AB>
<support>1</support>//indicating that the virtual AB system partition structure is supported
<uncompressCowsize>87602704384</uncompressCowsize>//indicating that the size that is of the update file corresponding to the sub-partition of the super partition and that exists before compression is 87602704384 bytes
<cowsize>7602704384</cowsize>//indicating that the size that is of the update file corresponding to the sub-partition of the super partition and that is obtained after compression is 7602704384 bytes
<payloadOffset>887</payloadOffset>//indicating that a location obtained after an offset of 887 bytes is the start location of payload.bin
<fileHash>
xobTFJapFXTOLnLFfki6EEgDtGtIMpUmpZpD/
9k1aRo=</fileHash>//in dicating a hash value used to check the file body in payload.bin
<fileSize>898039335</fileSize>//indicating that the size of the update package is 89803933 bytes
<metadataHash>6LcRfiwjdb7DmB/
ZFAXSkB3DTEPoW4E4KBXFq+Df5Bo=</metadataHash>//indicating a hash value used to indicate the size of the file metadata in payload.bin
<metadataSize>820940</metadataSize>//indicating that the size of the metadata is 820940 bytes
<powerWash>0</powerWash>//indicating that the update file is restored to the factory settings after updating
<switchSlotOnReboot>1</switchSlotOnReboot>//indicating that the static partition is switched after the update package is installed and before the electronic device reboots
<runPostInstall>1</runPostInstall>//indicating that the steps of the post-install script program (post-install) are performed
</VirtualAB>

It should be understood that the foregoing description is merely an example provided to better understand the technical solution of this embodiment, and is not used as a unique limitation on this embodiment.

S103: Upload the update package and filelist.xml.

For example, in some implementations, filelist.xml is stored in the update package.

For example, in some other implementations, filelist.xml is independent of the update package, so that when performing space determining, the electronic device only needs to first obtain filelist.xml that occupies smaller space, without obtaining the update package.

It should be understood that the foregoing description is merely an example provided to better understand the technical solution of this embodiment, and is not used as a unique limitation on this embodiment.

In addition, it should be noted that, in some implementations, for the update package and filelist.xml, the packaging server may actively upload an update package of a new version and corresponding filelist.xml to the OTA server when detecting that the update package of the new version and corresponding filelist.xml exist, or may actively and periodically upload a newly-issued update package and corresponding filelist.xml to the OTA server based on a preset period.

For example, in some other implementations, a condition under which the packaging server uploads the update package and filelist.xml may be that the packaging server uploads a newly-issued update package and corresponding filelist.xml to the OTA server after receiving a request from the OTA server.

It should be understood that the foregoing description is merely an example provided to better understand the technical solution of this embodiment, and is not used as a unique limitation on this embodiment.

S104: Store the update package and filelist.xml.

For example, in some implementations, to prevent a redundancy version from occupying space of the OTA server, the OTA server may periodically traverse stored update packages and corresponding filelist.xml, to clean the redundancy version.

For example, in some other implementations, to further reduce space occupation for the OTA server, the OTA server may periodically clean an updated version of an old version and corresponding filelist.xml.

It should be understood that the foregoing description is merely an example provided to better understand the technical solution of this embodiment, and is not used as a unique limitation on this embodiment.

S105: Determine, through searching, whether an update package exists in the OTA server.

It may be understood that, usually, for massive user groups, the update package for updating the operating system installed in the electronic device is produced by the packaging server and then uploaded by the packaging server to the OTA server for management. The OTA server further exchanges data with the accessed electronic device, in other words, establishes a communication link with the electronic device. Therefore, in some implementations, the electronic device may actively initiate a search request to the OTA server, to determine whether an update package corresponding to an operating system of a new version exists in the OTA server.

For example, in some other implementations, when detecting that there is an update package corresponding to an operating system of a new version, the OTA server may actively push notification information to notify the electronic device that currently there is an update package of an operating system of a new version.

For ease of description, in this embodiment, for example, the electronic device actively initiates a search request to the OTA server, to determine, through searching, whether an update package corresponding to an operating system of a new version exists in the OTA server.

Correspondingly, if it is determined, through searching, that an update package corresponding to an operating system of a new version exists in the OTA server, step S106 is performed; otherwise, a search request is periodically initiated to the OTA server based on a set search period, or a search request is initiated to the OTA server when the user performs triggering.

It should be understood that the foregoing description is merely an example provided to better understand the technical solution of this embodiment, and is not used as a unique limitation on this embodiment.

S106: Obtain filelist.xml.

For example, in the operating system update solution provided in this embodiment, if the electronic device determines, through searching, that an update package corresponding to an operating system of a new version exists in the OTA server, the electronic device first initiates a request for obtaining filelist.xml corresponding to the update package to the OTA server, instead of directly initiating a request for obtaining the update package.

In addition, it may be learned from the foregoing description that, in the operating system update solution provided in this embodiment, fileSize, compressCowsize, and uncompressCowsize are recorded in filelist.xml. Therefore, when finding that an update package corresponding to an operating system of a new version exists in the OTA server, the electronic device first obtains filelist.xml corresponding to the update package, so that it can be determined, based on fileSize, compressCowsize, and uncompressCowsize that are recorded in filelist.xml and current available space of the electronic device, whether the current available space can accommodate the update package, to determine whether to install, by using a cow compression function, an update file that is in the update package and that corresponds to the super partition.

S107: Deliver filelist.xml.

For example, after receiving a request that is for requesting to obtain filelist.xml corresponding to an update package of an operating system and that is sent by the electronic device, the OTA server extracts filelist.xml from a specified storage address, and then delivers filelist.xml to the corresponding electronic device.

S108: Set a compression attribute based on first available space of the current device, fileSize, compressCowsize, and uncompressCowsize.

For example, step S108 may be divided into the following three cases based on an actual case: (1) setting the compression attribute to "false" if the first available space is greater than fileSize+uncompressCowsize; (2) setting the compression attribute to "true" if the first available space is greater than fileSize+compressCowsize and less than fileSize+uncompressCowsize; and (3) in another case, for example, if the first available space is less than fileSize+compressCowsize, prompting, by using a pop-up box, the user to clean the user data partition.

For ease of description, in this embodiment, for example, the set compression attribute is "true" in step S108.

It may be understood that, in an operating system update process, the update package needs to be first downloaded to the user data partition of the electronic device, and then the update package is decompressed. A sub-partition of the static partition is updated based on an update file that is in the update package and that is used to update the static partition. Specifically, data in update files corresponding to different sub-partitions of the static partition is written into the corresponding sub-partitions. A sub-partition of the super partition is updated based on an update file that is in the update package and that is used to update the super partition. Specifically, data in update files corresponding to different sub-partitions of the super partition is first written into cow files created in the user data partition. Therefore, the available space (specifically, available space of the user data partition) of the current device, fileSize, compressCowsize, and uncompressCowsize are comprehensively considered when the compression attribute is being set, thereby ensuring that the set compression attribute is more proper.

Figure 9:
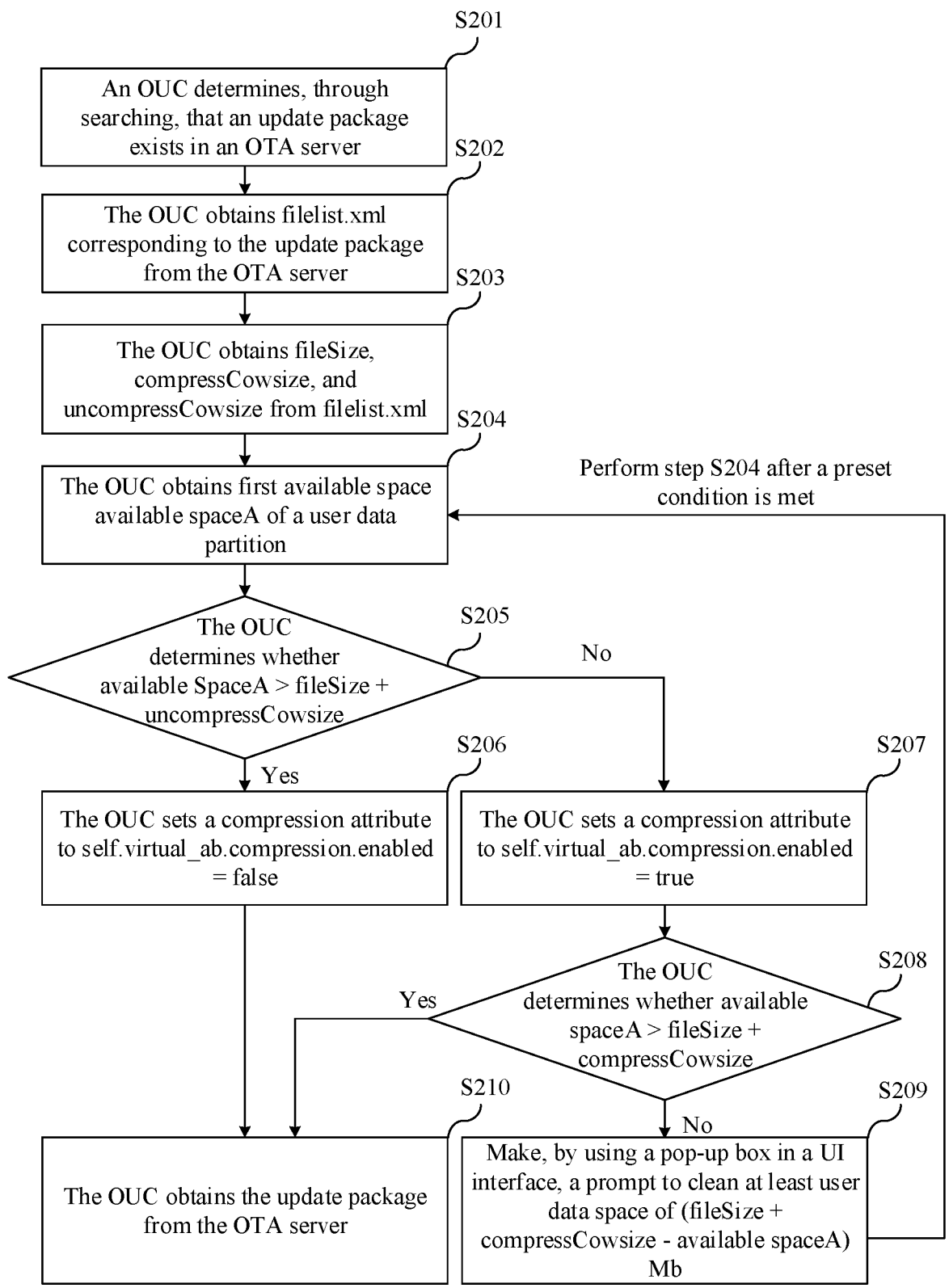
FIG. 9 is an example of a schematic flowchart of setting a compression attribute based on a first-time space determining result in an operating system update process.

For a better understanding of the content described in S105 to S108 in this embodiment, the following provides detailed description with reference to FIG. 9.

For example, referring to FIG. 9, the following steps are specifically included.

S201: The OUC determines, through searching, that an update package exists in the OTA server.

For details of an implementation in which the OUC determines, through searching, whether an update package exists in the OTA server, refer to the foregoing description of step S105. Details are not described herein again.

S202: The OUC obtains filelist.xml corresponding to the update package from the OTA server.

It may be understood that in this embodiment, filelist.xml is used to record description information associated with the update package, and therefore may be referred to as file list description information in some implementations.

For example, in this embodiment, the file list description information (filelist.xml) indicates a first size (fileSize) of the update package, a second size (compressCowsize) of a first update file in the update package, and a third size (uncompressCowsize) of the first update file.

It may be understood that the first update file corresponds to a first sub-partition of the super partition, the second size is a compressed size, and the third size is an uncompressed size.

For example, when one sub-partition of the super partition needs to be updated, a first sub-partition may be any one of a System sub-partition, a system_ext sub-partition, a Product sub-partition, a Cust sub-partition, and an Odm sub-partition of the super partition (Super) in FIG. 7.1 to FIG. 7.6.

For example, when a plurality of sub-partitions of the super partition need to be updated, first sub-partitions may be any several of the System sub-partition, the system_ext sub-partition, the Product sub-partition, the Cust sub-partition, and the Odm sub-partition of the super partition (Super) in FIG. 7.1 to FIG. 7.6.

It should be understood that the foregoing description is merely an example provided to better understand the technical solution of this embodiment, and is not used as a unique limitation on this embodiment. The "first sub-partition" described in the foregoing embodiment is merely intended to indicate that the sub-partition is a sub-partition of the super partition, and is used as a limitation on a quantity of sub-partitions of the super partition and a specific sub-partition.

Similarly, the "first update file" described above is merely intended to indicate that the update file is used to update a sub-partition of the super partition, and is not used as a limitation on a quantity of update files for updating sub-partitions of the super partition and a sub-partition to which the update file specifically correspond.

S203: The OUC obtains fileSize, compressCowsize, and uncompressCowsize from filelist.xml.

For example, based on the foregoing listed content of filelist.xml, content between "<fileSize>" and "</fileSize>" indicates fileSize, and therefore fileSize only needs to be obtained from the content between the two fields "<fileSize>" and "</fileSize>".

Correspondingly, content between "<cowsize>" and "</cowsize>" indicates compressCowsize, and therefore compressCowsize only needs to be obtained from the content between the two fields "<cowsize>" and "</cowsize>".

Correspondingly, content between "<uncompressCowsize>" and "</uncompressCowsize>" indicates uncompressCowsize, and therefore uncompressCowsize only needs to be obtained from the content between the two fields "<uncompressCowsize>" and "</uncompressCowsize>".

S204: The OUC obtains first available space available spaceA of the user data partition.

It may be understood that the first available space described in this embodiment is available space that is of the user data partition and that exists before the update package is downloaded.

S205: The OUC determines whether available spaceA>fileSize+uncompressCowsize.

To be specific, the OUC calculates a sum (referred to as a first sum in this embodiment) of fileSize and uncompressCowsize, and then determines whether the first available space is greater than the first sum.

Correspondingly, if the first available space is greater than the first sum, step S206 is performed; otherwise, step S207 is performed.

S206: The OUC sets a compression attribute to self.virtual_ab.compression.enabled=false.

For example, in this embodiment, when the first available space is greater than the first sum, the OUC sets an identifier corresponding to the compression attribute to a first identifier, namely, self.virtual_ab.compression.enabled=false.

It should be noted that the first identifier, for example, "false" given in this embodiment, is used to indicate that the first update file is not installed by using the cow compression function.

For example, during actual application, alternatively, it may be agreed to use "0" to indicate that the first update file is not installed by using the cow compression function.

It should be understood that the foregoing description is merely an example provided to better understand the technical solution of this embodiment, and is not used as a unique limitation on this embodiment.

For example, when the first available space is greater than the first sum, it indicates that available space of the user data partition is sufficient. In this case, the OUC can directly initiate a request for obtaining the update package to the OTA server, in other words, perform step S210.

S207: The OUC sets a compression attribute to self.virtual_ab.compression.enabled=true.

For example, in this embodiment, when the first available space is not greater than the first sum, the OUC sets an identifier corresponding to the compression attribute to a second identifier, namely, self.virtual_ab.compression.enabled=true.

It should be noted that the second identifier, for example, "true" given in this embodiment, is used to indicate that the first update file is installed by using the cow compression function.

For example, during actual application, alternatively, it may be agreed to use "1" to indicate that the first update file is installed by using the cow compression function.

It should be understood that the foregoing description is merely an example provided to better understand the technical solution of this embodiment, and is not used as a unique limitation on this embodiment.

For example, when the first available space is not greater than the first sum, it indicates that available space of the user data partition is insufficient. In this case, according to a space priority principle, the compression attribute is set to "use the cow compression function", so that space occupation for the user data partition can be minimized.

S208: The OUC determines whether available spaceA>fileSize+compressCowsize.

For example, after the OUC sets the identifier corresponding to the compression attribute to the second identifier, namely, true, the OUC performs determining again to ensure that a current available user data partition of the electronic device can accommodate the update package and a compressed first update file.

Specifically, the OUC calculates a sum (referred to as a second sum in this embodiment) of fileSize and compressCowsize, and then determines whether the first available space is greater than the second sum.

Correspondingly, if the first available space is greater than the second sum, step S210 is performed; otherwise, step S209 is performed.

To be specific, only when the first available space of the user data partition is greater than the sum of the first size and the second size and less than the sum of the first size and the third size, a cow file (compressed cow file) corresponding to the first sub-partition is subsequently created in a compressed form.

S209: Make, by using a pop-up box in a UI interface, a prompt to clean at least user data space of (fileSize+compressCowsize-available spaceA) Mb.

For example, if it is determined that current first available space of the user data partition is insufficient to accommodate the update package and the compressed first update file even if the cow compression function is used, to ensure that current-time operating system updating can be successfully performed, the OUC calculates a difference (referred to as a first difference in this embodiment), namely, (fileSize+compressCowsize-available spaceA), between the second sum and the first available space, and then makes, to the user by using the pop-up box (a pop-up window) in the UI interface, a prompt that the user needs to clean at least space of the first difference in the user data partition. In this way, even if the user needs to clean content in the user data partition, a size of a file that needs to be deleted can be reduced, so that interference caused when the user uses the electronic device can be minimized.

For example, after the prompt in step S209 is made, step S204 is re-performed if it is detected that a preset condition is met. For an implementation of re-performing step S204 if the preset condition is met, refer to the description of cleaning the user data partition when the space of the user data partition is insufficient in step (2) in FIG. 7.1. Details are not described herein again.

S210: The OUC obtains the update package from the OTA server.

For example, in some implementations, the OUC may obtain the update package from the OTA server based on information, such as address information of the update package, recorded in filelist.xml.

It should be understood that the foregoing description is merely an example provided to better understand the technical solution of this embodiment, and is not used as a unique limitation on this embodiment.

Space determining performed before the OUC obtains the update package from the OTA server and the compression attribute are not further described. The following continues to describe, with reference to FIG. 8.2 when the compression attribute that is set in step S108 is "true", the operating system update solution provided in this embodiment.

S109: Obtain the update package.

A specific manner in which the OUC of the electronic device obtains the update package from the OTA server is not described herein again.

S110: Deliver the update package.

To be specific, after receiving a request initiated by the OUC for obtaining the update package, the OTA server sends the requested update package to the OUC in response to the request.

In addition, it should be noted that, to avoid a case in which because other data or another file occupies the first available space in an update package downloading process, the first available space is not greater than the sum of fileSize and uncompressCowsize, in other words, not greater than the first sum, and consequently an installation manner determined based on a compression attribute that is set before the update package is downloaded is improper, and therefore operating system updating cannot be normally performed, in the operating system update solution provided in this embodiment, after obtaining the update package from the OTA server, the OUC updates the static partition and the super partition based on update files in the update package, to be specific, before writing data in the update package into a corresponding sub-partition, the OUC may perform space determining again, and reset the compression attribute based on a determining result, in other words, perform step S111.

S111: Set the compression attribute based on fourth available space (available space obtained after the update package is downloaded) of the current device, compressCowsize, and uncompressCowsize.

For example, step S111 may be divided into the following three cases based on an actual case: (1) setting the compression attribute to "false" if the fourth available space is greater than uncompressCowsize; (2) setting the compression attribute to "true" if the fourth available space is greater than compressCowsize and less than uncompressCowsize; and (3) in another case, for example, if the fourth available space is less than compressCowsize, prompting, by using a pop-up box, the user to clean the user data partition.

For ease of description, in this embodiment, for example, the set compression attribute is "true" in step S111.

It may be understood that, during actual application, step S111 may be performed based on an actual requirement, and the step may be performed before an update instruction is delivered, may be performed before the static partition is updated and after the update instruction is delivered, or may be performed before the super partition is updated and after the static partition is updated. This is not limited herein. In this embodiment, for example, the step is performed before the update instruction is delivered.

Figure 10:
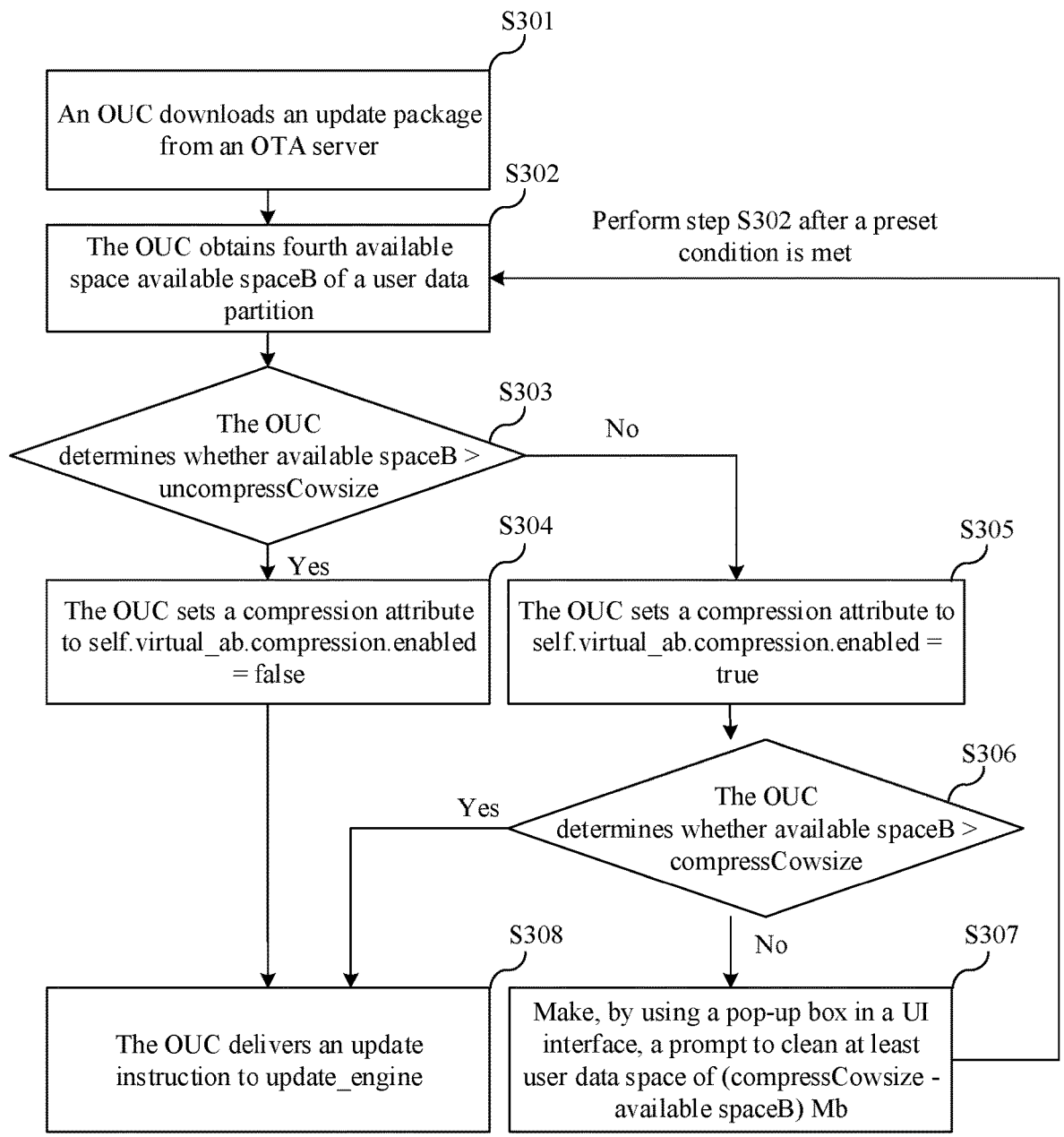
FIG. 10 is an example of a schematic flowchart of setting a compression attribute based on a second-time space determining result in an operating system update process.

For example, referring to FIG. 10, a process of setting the compression attribute based on a second-time space determining result in an operating system update process specifically includes the following steps.

S301: The OUC downloads the update package from the OTA server.

S302: The OUC obtains the fourth available space available spaceB of the user data partition.

For example, after downloading the update package from the OTA server, the OUC re-obtains current available space, namely, the fourth available space, of the user data partition.

S303: The OUC determines whether available spaceB>uncompressCowsize.

It may be understood that because the update package has been stored in the user data partition in this case, during current-time space determining, the OUC only needs to determine whether the fourth available space is greater than uncompressCowsize.

Correspondingly, if the fourth available space is greater than uncompressCowsize, it indicates that available space of the user data partition is sufficient, and the cow compression function may not be used during current-time operating system updating, so that efficiency can be prioritized to quickly complete the update operation.

S304: The OUC sets the compression attribute to self.virtual_ab.compression.enabled=false.

For example, in this embodiment, when the fourth available space is greater than uncompressCowsize, the OUC sets the identifier corresponding to the compression attribute to the first identifier, namely, self.virtual_ab.compression.enabled=false.

It may be learned from the foregoing description that, the first identifier, for example, "false" given in this embodiment, is used to indicate that the first update file is not installed by using the cow compression function.

For example, during actual application, alternatively, it may be agreed to use "0" to indicate that the first update file is not installed by using the cow compression function.

It should be understood that the foregoing description is merely an example provided to better understand the technical solution of this embodiment, and is not used as a unique limitation on this embodiment.

For example, when the fourth available space is greater than uncompressCowsize, it indicates that available space of the user data partition is sufficient. In this case, the OUC can directly transmit the downloaded update package to update_engine, in other words, perform step S308.

S305: The OUC sets the compression attribute to self.virtual_ab.compression.enabled=true.

For example, in this embodiment, when the fourth available space is not greater than uncompressCowsize, the OUC sets the identifier corresponding to the compression attribute to the second identifier, namely, self.virtual_ab.compression.enabled=true.

It may be learned from the foregoing description that, the second identifier, for example, "true" given in this embodiment, is used to indicate that the first update file is installed by using the cow compression function.

For example, during actual application, alternatively, it may be agreed to use "1" to indicate that the first update file is installed by using the cow compression function.

It should be understood that the foregoing description is merely an example provided to better understand the technical solution of this embodiment, and is not used as a unique limitation on this embodiment.

For example, when the fourth available space is not greater than uncompressCowsize, it indicates that available space of the user data partition is insufficient. In this case, according to a space priority principle, the compression attribute is set to "use the cow compression function", so that space occupation for the user data partition can be minimized.

S306: The OUC determines whether available spaceB>compressCowsize.

For example, after the OUC sets the identifier corresponding to the compression attribute to the second identifier, namely, true, the OUC performs determining again to ensure that a current available user data partition of the electronic device can accommodate the compressed first update file. To be specific, the OUC determines whether the fourth available space is greater than compressCowsize.

Correspondingly, if the fourth available space is greater than compressCowsize, step S308 is performed; otherwise, step S307 is performed.

S307: Make, by using a pop-up box in a UI interface, a prompt to clean at least user data space of (compressCowsize-available spaceB) Mb.

For example, if it is determined that current fourth available space of the user data partition is insufficient to accommodate the compressed first update file even if the cow compression function is used, to ensure that current-time operating system updating can be successfully performed, the OUC calculates a difference (referred to as a second difference in this embodiment), namely, (compressCowsize-available spaceB), between compressCowsize and the fourth available space, and then makes, to the user by using the pop-up box (a pop-up window) in the UI interface, a prompt that the user needs to clean at least space of the second difference in the user data partition. In this way, even if the user needs to clean content in the user data partition, a size of a file that needs to be deleted can be reduced, so that interference caused when the user uses the electronic device can be minimized.

For example, after the prompt in step S307 is made, step S302 is re-performed if it is detected that a preset condition is met. For an implementation of re-performing step S302 if the preset condition is met, refer to the description of cleaning the user data partition when the space of the user data partition is insufficient in step (4) in FIG. 7.2. Details are not described herein again.

S308: The OUC delivers the update instruction to update_engine.

Therefore, after downloading the update package, before notifying update_engine to install an update file in the update package, the OUC further determines available space of the user data partition, and resets the compression attribute based on a determining result, to further ensure properness of an installation manner subsequently determined based on the compression attribute, thereby ensuring that operating system updating can be normally completed.

Space determining performed before installation after the OUC downloads the update package from the OTA server and the compression attribute are not further described. The following continues to describe, with reference to FIG. 8.2 to FIG. 8.4 when the compression attribute that is set in step S111 is "true", the operating system update solution provided in this embodiment.

S112: Deliver the update instruction.

It may be understood that for the electronic device of the Android system, operating system updating is mainly completed by the update engine (update_engine). Therefore, after downloading the update package from the OTA server and completing compression attribute resetting, the OUC delivers the update instruction to update_engine, to trigger update_engine to start performing an update procedure.

S113: Update the static partition based on an update file that is in the update package and that corresponds to the static partition.

For description of static-partition updating, refer to the description of step (3) in FIG. 7.1. Details are not described herein again.

In addition, it should be noted that during actual application, this step is an optional step for the technical solution provided in this embodiment, in other words, step S113 is performed only when the update package includes the update file for updating the static partition.

S114: Determine that the set compression attribute is "true", and invoke the snapshot process to create a compressed cow file.

For example, after receiving the update instruction, update_engine reads the compression attribute that is set by the OUC, for example, reads the compression attribute by using a getprop statement.

Specifically, if the identifier corresponding to the read compression attribute is the foregoing first identifier (for example, false), it is determined that an installation manner corresponding to the first update file (an update file for updating the sub-partition of the super partition) is a first installation manner in which installation is not performed by using the cow compression function; or if the identifier corresponding to the read compression attribute is the foregoing second identifier (true), it is determined that an installation manner corresponding to the first update file (an update file for updating the sub-partition of the super partition) is a second installation manner in which installation is performed by using the cow compression function.

S115: Create a compressed cow file in a compressed form in the user data partition.

For example, in this embodiment, the set compression attribute is "true". Therefore, the compression attribute determined by update_engine is "true", and the snapshot process creates a second cow file (hereinafter referred to as a compressed cow file) in the compressed form in the user data partition, in other words, creates the compressed cow file in the compressed form in the user data partition based on the second identifier.

It may be understood that this embodiment is described by using an example in which the compression attribute is the foregoing second identifier. During actual application, if the identifier corresponding to the read compression attribute is the foregoing first identifier (for example, false), it is determined that the installation manner corresponding to the first update file (the update file for updating the sub-partition of the super partition) is the first installation manner in which installation is not performed by using the cow compression function. In this case, the snapshot process creates a first cow file (hereinafter referred to as an uncompressed cow file) corresponding to the first sub-partition in an uncompressed form in the user data partition based on the first identifier, so that update_engine writes the first update file into the uncompressed cow file in an uncompressed form.

It may be understood that in this embodiment, a size of the first cow file is greater than a size of the second cow file, in other words, uncompressCowsize of the uncompressed cow file is greater than compressCowsize of the compressed cow file.

S116: Feed back a creation success of the compressed cow file.

It may be understood that, to enable update_engine to learn when to start writing, in the compressed form, data in the first update file into the compressed cow file that is in the user data partition and that corresponds to the first sub-partition, after successfully creating the compressed cow file, the snapshot process feeds back a creation success message of the compressed cow file to update_engine.

Correspondingly, after receiving the creation success message that is of the compressed cow file and that is fed back by the snapshot process, update_engine performs step S117.

S117: Write data in the update file that is in the update package and that corresponds to the super partition into the compressed cow file in the compressed form.

It may be understood that, during actual application, if update_engine invokes the snapshot process to create the uncompressed cow file in the uncompressed form in the user data partition, after successfully creating the uncompressed cow file, the snapshot process feeds back a creation success message of the uncompressed cow file to update_engine, so that update_engine writes, after receiving the creation success message that is of the uncompressed cow file and that is fed back by the snapshot process, the data in the update file that is in the update package and that corresponds to the super partition into the uncompressed cow file in the uncompressed form.

For example, in this embodiment, the writing the data in the update file (hereinafter referred to as the first update file) that is in the update package and corresponds to the super partition into the compressed cow file in the compressed form is removing all 0s in the data in the first update file according to a preset compression algorithm, and then writing data obtained after the 0s are removed into the compressed cow file.

For example, the preset compression algorithm in this embodiment may be, for example, a redundancy compression method or a lossless compression method, namely, a method in which redundancy is removed without a reduction in an amount of information and data can still be restored.

In addition, it should be noted that, during actual application, if the snapshot process fails to create a cow file (regardless of whether the cow file is a compressed cow file or an uncompressed cow file), the snapshot process feeds back a creation failure message of the cow file to update_engine, so that update_engine ends a current-time operating system update operation after receiving the creation failure message that is of the cow file and that is fed back by the snapshot process, and directly reports update failure information to the OTA server.

Further, for a manner of writing the update file corresponding to the super partition into the compressed cow file in the compressed form, or writing the update file corresponding to the super partition into the uncompressed cow file in the uncompressed form, refer to an existing standard. Details are not described herein.

Figure 11:
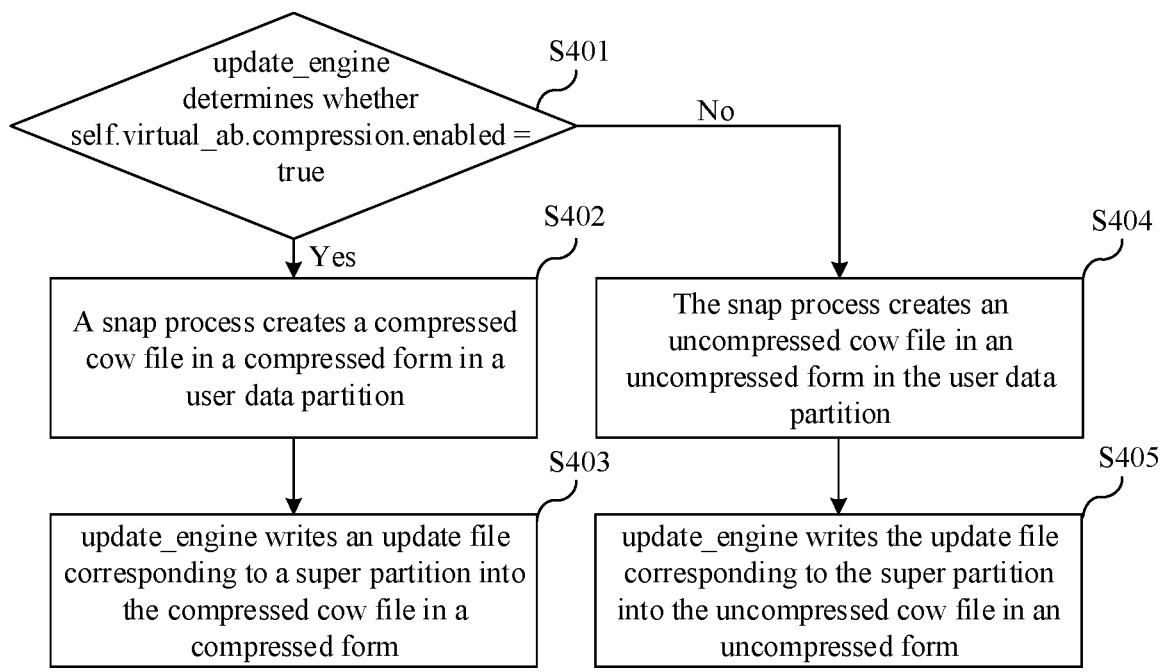
FIG. 11 is an example of a schematic flowchart of selecting different installation manners based on different compression attributes to install an update file corresponding to a super partition in an operating system update process.

For a better understanding of the content described in S114 to S117 in this embodiment, the following provides detailed description with reference to FIG. 11.

For example, referring to FIG. 11, the following steps are included.

S401: update_engine determines whether self.virtual_ab.compression.enabled=true.

To be specific, after receiving the update instruction delivered by the OUC, update_engine reads the compression attribute that is set by the OUC.

Correspondingly, if the identifier corresponding to the read compression attribute is the foregoing second identifier (true), update_engine determines that the installation manner corresponding to the first update file (the update file for updating the sub-partition of the super partition) is the second installation manner in which installation is performed by using the cow compression function, and update_engine notifies the snapshot process to create the compressed cow file in the compressed form in the user data partition, in other words, perform step S402; or if the identifier corresponding to the read compression attribute is the foregoing first identifier (for example, false), update_engine determines that the installation manner corresponding to the first update file (the update file for updating the sub-partition of the super partition) is the first installation manner in which installation is not performed by using the cow compression function, and update_engine notifies the snapshot process to create the uncompressed cow file in the uncompressed form in the user data partition, in other words, perform step S404.

S402: The snapshot process creates the compressed cow file in the user data partition.

S403: update_engine writes the update file corresponding to the super partition into the compressed cow file in the compressed form.

For example, when the installation manner is the second installation manner, in other words, the compression attribute indicates that the cow compression function is used, update_engine writes the first update file into the compressed cow file in the compressed form, so that space occupation for the user data partition can be minimized.

S404: The snapshot process creates the uncompressed cow file in the user data partition.

S405: update_engine writes the update file corresponding to the super partition into the uncompressed cow file in the uncompressed form.

For example, when the installation manner is the first installation manner, in other words, the compression attribute indicates that the cow compression function is not used, update_engine writes the first update file into the uncompressed cow file in the uncompressed form, so that efficiency is prioritized in an operating system update process. Because the first update file is directly written into the uncompressed cow file without being compressed, a writing speed is high, so that operating system update duration is shortened and power consumption of the electronic device is also reduced.

Space determining performed before the OUC obtains the update package from the OTA server and the compression attribute are not further described. The following continues to describe, with reference to FIG. 8.4, the operating system update solution provided in this embodiment.

S118: Check the written update file.

For example, to check the written update file, according to existing update logic, the static partition needs to be first updated based on the update package. After the static partition is updated, the super partition is updated based on the update package. After the super partition is updated, the static partition and the super partition are sequentially checked.

For ease of being distinguished from the first update file for the first sub-partition of the super partition, the update file for updating the sub-partition of the static partition is referred to as a second update file in this embodiment.

For example, in the operating system update process, the update engine obtains the second update file from the update package, and then updates data in a current idle static partition based on the second update file.

For example, when boot starts from a first static partition, specifically, data in a second static partition is updated based on the second update file in the operating system update process performed after the electronic device boots.

For check processes of the sub-partition that is of the static partition and for which updating is completed and the sub-partition (specifically, a corresponding cow file in the user data partition) that is of the super partition and for which updating is completed, refer to an existing standard. Details are not described herein.

For example, after check succeeds, update_engine reports check success information to the OUC, in other words, performs step S119.

It should be noted that during actual application, if check fails, the update_engine also reports check information to the OUC. In this case, check failure information is reported.

For ease of description of a subsequent update procedure, in this embodiment, for example, update_engine reports the check success information to the OUC.

Correspondingly, after update_engine reports the check success information to the OUC, the OUC performs step S120.

S120: Trigger entire system reboot.

For example, after check is completed, the OUC triggers the electronic device to perform entire system reboot. For details of the operation in which the OUC triggers the electronic device to perform entire system reboot, refer to the description of the electronic device reboot part in step (9) in FIG. 7.4 in the foregoing embodiment.

It should be noted that the operation in which the OUC triggers entire system reboot is specifically completed by the snapshot process. Therefore, after the OUC triggers entire system reboot, the snapshot process performs an operation in step S121.

S121: In a reboot process, decompress the compressed cow file, load the data in the compressed cow file, and run an updated operating system.

In this embodiment, the cow compression function is used, to be specific, the update file for the sub-partition of the super partition is written into the compressed cow file in the compressed form. Therefore, when data in a common partition, data in the second static partition, data in the super partition, and the data in the compressed cow file in the user data partition are sequentially loaded after the electronic device reboots, the cow file needs to be decompressed. In this way, the compressed data in the compressed cow file can be processed into an uncompressed format and then loaded, so that the electronic device runs the updated operating system (hereinafter referred to as a second operating system).

Correspondingly, if the update file for the super partition is written into the uncompressed cow file in the uncompressed form, when the data in the common partition, the data in the second static partition, the data in the super partition, and the data in the uncompressed cow file in the user data partition are sequentially loaded after the electronic device is rebooted, the uncompressed cow file does not need to be decompressed and the data can be directly read from the uncompressed cow file.

In addition, it should be noted that, in this embodiment, the electronic device boots from the first static partition in a boot sequence before updating the operating system, to be specific, the data in the common partition, data in the first static partition, and the data in the super partition are sequentially loaded at the time of boot. In the foregoing operating system update solution, the second static partition is updated. Therefore, the data in the second static partition needs to be loaded at the time of reboot, in other words, the boot sequence is changed from booting from the first static partition to booting from the second static partition.

For example, after the electronic device is rebooted to run the second operating system, the snapshot process notifies the kernel to perform a Merge operation, namely, step S122.

Correspondingly, after receiving the notification that is for performing the Merge operation and that is sent by the snapshot process, the kernel performs step S123.

S123: Perform the Merge operation to merge the data in the compressed cow file into the corresponding sub-partition of the super partition.

It may be understood that the Merge operation in this embodiment is specifically a process of merging the update file that is in the user data partition and that is for updating the super partition into the super partition, namely, a process of merging the data in the cow file into the corresponding sub-partition of the super partition.

For a specific implementation procedure of the Merge operation, refer to an existing standard. Details are not described in this embodiment.

S124: Report Merge success information.

For example, after the Merge operation is completed, the kernel reports a Merge result to the update engine, so that the update engine learns whether the update file that is in the user data partition and that is for updating the super partition is merged into the super partition.

Correspondingly, if the Merge operation succeeds, to be specific, the update file that is in the user data partition and that is for updating the super partition is merged into the super partition, step S125 is performed; otherwise, a update failure may be directly reported to the OTA server by using the OUC.

For example, in some implementations, after the Merge operation fails, the OUC may reboot the electronic device to control the electronic device to roll back from the second operating system to the first operating system, so that the electronic device can be normally used even if updating fails.

For ease of description, in this embodiment, for example, Merge succeeds.

S125: Perform partition synchronization on the static partition.

Still in the example in which the data in the second static partition is updated based on the second update file, after Merge succeeds, the partition synchronization operation performed on the static partition is specifically synchronizing the data in the second static partition to the first static partition.

For the operation of synchronizing the data in the second static partition to the first static partition, in some implementations, for example, the kernel may read data in each sub-partition of the second static partition, and then overwrite the data in each sub-partition of the second static partition into a corresponding sub-partition of the first static partition.

It may be understood that, during actual application, only one or several sub-partitions of the static partition may be updated during operating system updating. Therefore, at the time of partition synchronization, to reduce electronic device resources occupied by partition synchronization, it may be first checked whether data in a second sub-partition of the second static partition is the same as data in a third sub-partition of the first static partition.

Correspondingly, if the data in the second sub-partition is the same as (consistent with) the data in the third sub-partition, no copying is performed for the sub-partition and other sub-partitions continue to be compared; otherwise, the data in the second sub-partition is copied and then overwritten into the third sub-partition.

For example, for the foregoing solution of first checking whether the data in the second sub-partition of the second static partition is the same as the data in the third sub-partition of the first static partition, and then determining, based on a check result, whether to perform partition synchronization, during specific implementation, processing may be as follows:

First, a hash value of the data in the second sub-partition and a hash value of the data in the third sub-partition are calculated.

Specifically, the second sub-partition is a sub-partition of the second static partition, the third sub-partition is a sub-partition of the first static partition, and the third sub-partition corresponds to the second sub-partition.

For example, still referring to FIG. 7.1 to FIG. 7.6, if the second sub-partition of the second static partition is X-loader_b, the third sub-partition that is of the first static partition and that corresponds to the second sub-partition is X-loader_a.

It should be understood that the foregoing description is merely an example provided to better understand the technical solution of this embodiment, and is not used as a unique limitation on this embodiment.

Then, when the hash value of the data in the second sub-partition is inconsistent with the hash value of the data in the third sub-partition, the data in the second sub-partition is overwritten into the third sub-partition.

S126: Report update success information.

For example, after the static-partition synchronization operation is performed, the OUC reports an update result to the OTA server regardless of whether partition synchronization succeeds, so that the OTA server learns whether current-time operating system updating succeeds. For details of the operation in which the OUC reports the update result to the OTA server, refer to the description of the update result reporting part in step (12) in FIG. 7.6 in the foregoing embodiment. Details are not described herein again.

Further, it should be noted that setting may be performed, based on a service requirement, on whether step S118, step S119, and step S125 that are shown in FIG. 8.4 are performed, whether the steps are performed causes no impact on the technical solution provided in this embodiment, and this embodiment is described by using an example in which the steps are performed.

In addition, it should be noted that when the operating system is updated by using the technical solution provided in this embodiment, to learn whether the electronic device uses the cow compression function in the operating system update process, it may be specified that if the first available space of the user data partition is greater than the sum of the first size and the third size, the electronic device does not perform a read/write operation other than operating system updating on the user data partition in the operating system update process. Correspondingly, if the first available space of the user data partition is greater than the sum of the first size and the second size and less than the sum of the first size and the third size, the electronic device does not perform a read/write operation other than operating system updating on the user data partition in the operating system update process. In this way, before the electronic device updates the operating system, available space (the foregoing first available space, specifically, available space that is of the user data partition and that exists before the update package is downloaded) of the user data partition is recorded; and after the data of the super partition is written into the cow file in the user data partition according to the technical solution provided in this embodiment, before reboot, available space of the user data partition is obtained. A size of the cow file may be determined by using a difference between the available space that is of the user data partition and that exists before updating and the available space that is of the user data partition and that exists before reboot. Based on the size of the cow file, on the premise that it is specified that the size of the first cow file is greater than the size of the second cow file in this embodiment, it may be determined whether the cow compression function is used during current-time updating.

For example, for ease of description of the size of the first cow file and the size of the second cow file, in this embodiment, available space that is of the user data partition and that is obtained after the update package is downloaded and the first cow file is created is referred to as second available space, and available space that is of the user data partition and that is obtained after the update package is downloaded and the second cow file is created is referred to as third available space.

Correspondingly, the size of the first cow file is equal to a value obtained by subtracting the second available space and the first size from the first available space, and the size of the second cow file is equal to a value obtained by subtracting the third available space and the first size from the first available space.

For ease of understanding, the following provides description with reference to examples. Assuming that the first available space of the user data partition is 10.0 G, available space obtained after the update package is downloaded and a cow file is created is 825.2 M, and the first size of the update package is 506 M, based on the given calculation manners of the first cow file and the second cow file, it may be learned that the created cow file occupies 8.7 G (10.0 G-825.2 M-506 M) of the user data partition.

Correspondingly, if the first available space of the user data partition is 2.0 G, available space obtained after the update package is downloaded and a cow file is created is 518 M, and the first size of the update package is 506 M, based on the given calculation manners of the first cow file and the second cow file, it may be learned that the created cow file occupies 1.0 G (2.0 G-518 M-506 M) of the user data partition.

Based on the principle that the size of the first cow file (a cow file created in the uncompressed form) is greater than the size of the second cow file (a cow file created in the compressed form), it may be learned that, for operating system update scenarios in which update packages are 506 M, when the first available space that is of the user data partition and that exists before the update package is downloaded is 10.0 G, and the available space obtained after the update package is downloaded and the cow file is created is 825.2 M, the cow compression function is not used during operating system updating; and when the first available space that is of the user data partition and that exists before the update package is downloaded is 2.0 G, and the available space obtained after the update package is downloaded and the cow file is created is 518 M, the cow compression function is used during operating system updating.

In addition, based on the foregoing scenarios, alternatively, it may be determined, by recording time required by the electronic device from downloading the update package to completing updating, whether the cow compression function is used during current-time updating.

It is easy to find that, in the operating system update solution provided in this embodiment, an installation manner of the update file corresponding to the sub-partition of the super partition depends on current available space of the user data partition and a size (a compressed size or an uncompressed size) of the update file, so that it can be determined, in an operating system update process based on a specific case, whether to use the cow compression function, thereby meeting different user requirements.

For a more intuitive understanding of impact of using the cow compression function and impact of not using the cow compression function on operating system updating, the following lists comparisons of operating system updating performed by using a differential update package and operating system updating performed by using a full update package.

TABLE 2

| | Differential update package | | | |
|---|---|---|---|---|
| | Not using the cow compression function | Using the cow compression function | Difference | Percentage |
| Installation | 142 s | 145 s | 3 | Increased by 2% |
| Check | 26 s | 108 s | 82 | Increased by 315% |
| Merge | 39 s | 218 s | 179 | Increased by 459% |
| Partition synchronization | 15 s | 15 s | 0 | 0 |
| Total | 225 s | 483 s | 258 | Increased by 115% |
| Occupied userdata size existing before reboot | 8.7 G | 1.0 G | 7.7 G | Reduced by 89% |
| Screen-on time at the time of reboot | 8 s | 8 s | 0 | 0 |
| Power consumption | 6873 update_engine: 2891 kernel_kworker: 3982 | 7882 update_engine: 3190 kernel_kworker: 4692 | 1009 | Increased by 15% |
| Size of the differential update package | 506M | 509M | | |

TABLE 3

| | Full update package | | | |
|---|---|---|---|---|
| | Not using the cow compression function | Using the cow compression function | Difference | Percentage |
| Installation | 384 s | 768 s | 384 | Increased by 100% |
| Check | 25 s | 123 s | 98 | Increased by 392% |
| Merge | 43 s | 63 s | 20 | Increased by 46% |
| Partition synchronization | 11 s | 11 s | 0 | 0 |
| Total | 463 s | 965 s | 502 | Increased by 108% |
| Occupied userdata size existing before reboot | 9.8 G | 5.5 G | 7.7 G | Reduced by 44% |
| Screen-on time at the time of reboot | 8 s | 8 s | 0 | 0 |
| Power consumption | 197360 update_engine: 94370 kernel_kworker: 4310 | 209037 update_engine: 204940 kernel_kworker: 4097 | 11677 | Increased by 6% |
| Size of the differential update package | 5.0 G | 5.0 G | | |

To make the data content listed in Table 2 and Table 3 clearer, for example, in Table 2, for an install operation, a check operation, a Merge operation, and the like related to the super partition, in an update manner in which the cow compression function is not used, time required for installation is 142 s, and in an update manner in which the cow compression function is used, time required for installation is 145 s. Therefore, the time spent for the install operation in the update manner in which the cow compression function is used is increased by 2% compared with the time spent for the install operation in the manner in which the cow file compression function is not used.

Correspondingly, time spent for the check operation is increased by 315%, time spent for the Merge operation is increased by 459%, and time spent for installation, check, and Merge is increased by 108% in total. As a result, overall power consumption of the electronic device is increased by 6% in an update process.

However, according to the data recorded in Table 2 and Table 3, an occupied user data partition (userdata) size existing before the electronic device reboots in a case of using the cow compression function is obviously less than an occupied user data partition size existing before the electronic device reboots in a case of not using the cow compression function, and is reduced by 89% for the differential update package and reduced by 44% for the full update package.

Therefore, it may be learned from Table 2 and Table 3 that, for a space-sensitive user, space is prioritized, the cow compression function is used, and update time, power consumption, and heat experience are sacrificed, but the user does not need to delete original data in the user data partition. For a space-insensitive user, efficiency is prioritized, and the cow compression function is not used, to ensure that operating system updating can be quickly completed.

Figure 12A:
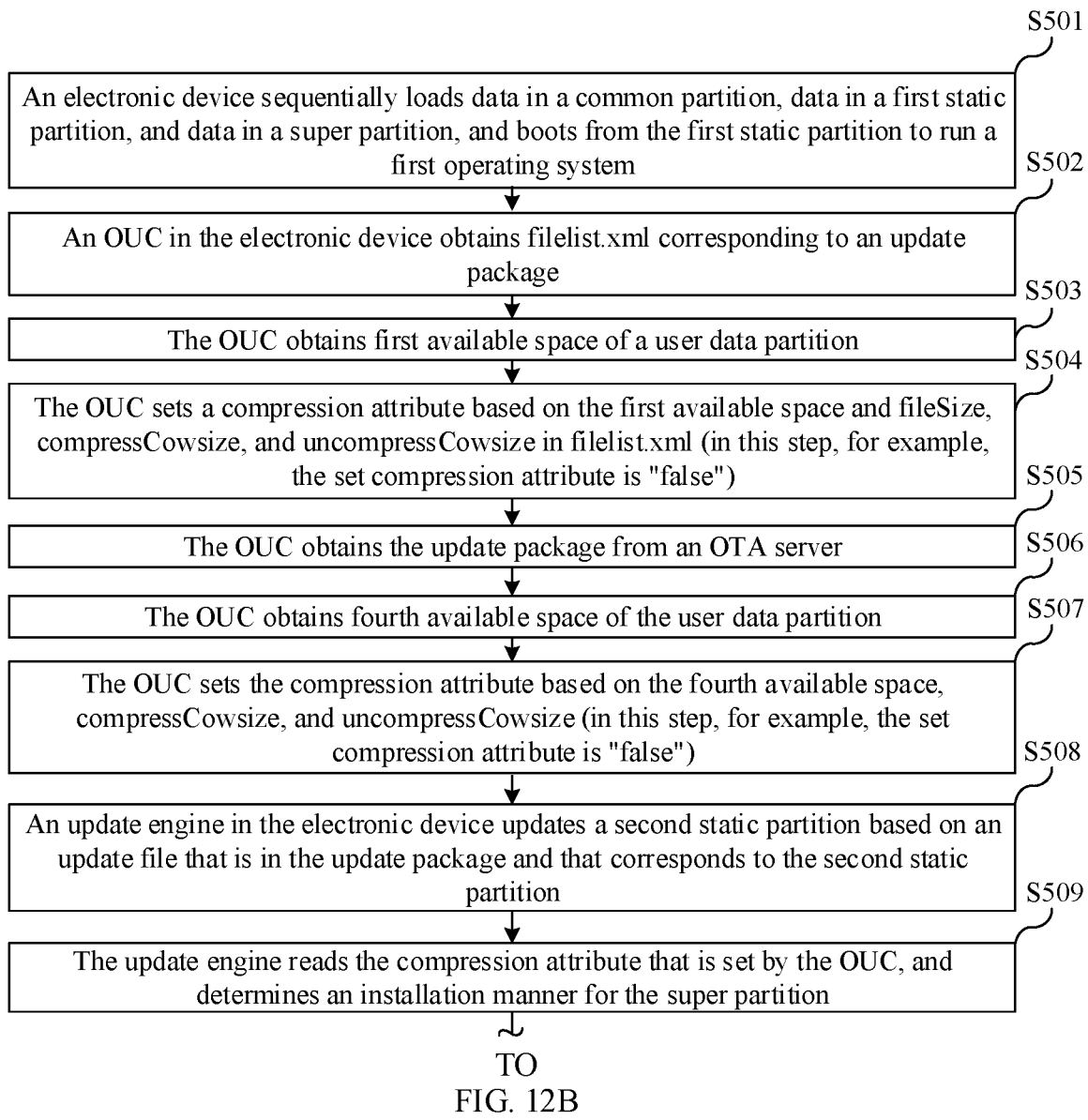
FIG. 12A and FIG. 12B are an example of a schematic flowchart in which an electronic device boots, then performs operating system updating, and then reboots to complete operating system updating.
Figure 12B:
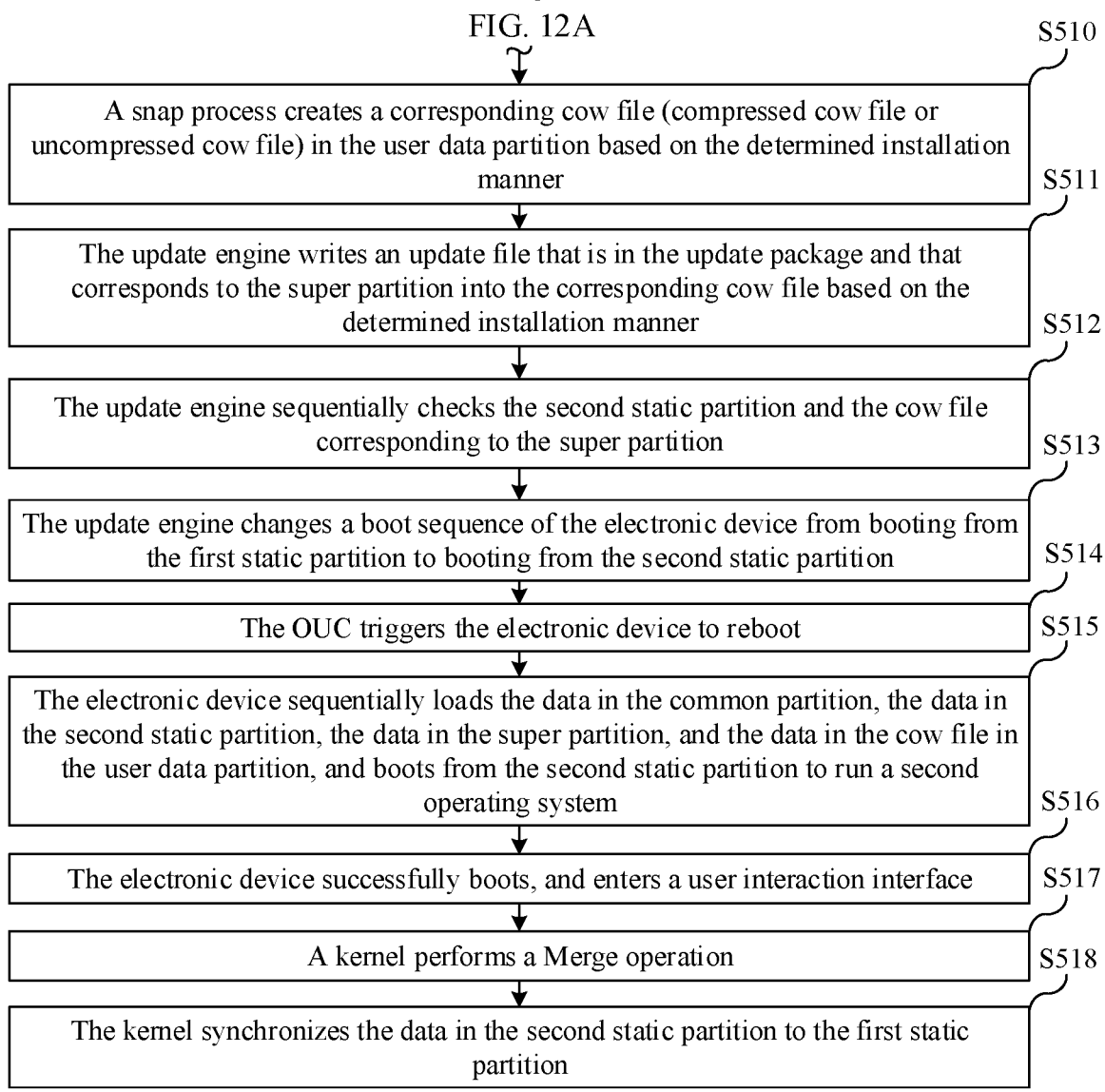

Further, for a better understanding of an overall procedure of implementing operating system updating based on the technical solution provided in this embodiment, the following provides description with reference to FIG. 12A and FIG. 12B.

It should be noted that a procedure shown in FIG. 12A and FIG. 12B for implementing operating system updating is implemented for a virtual AB system partition structure. When an electronic device currently boots from a first static partition, the electronic device implements operating system updating according to the procedure shown in FIG. 12A and FIG. 12B.

S501: The electronic device sequentially loads data in a common partition, data in the first static partition, and data in a super partition, and boots from the first static partition to run a first operating system.

S502: An OUC in the electronic device obtains filelist.xml corresponding to an update package.

For example, in a feasible implementation, the electronic device periodically initiates a package search request to an OTA server, where the package search request includes a version number (for example, a version 1.1) of an operating system currently run by the electronic device; the OTA server determines, through retrieving based on the version number of the operating system in the package search request, whether an update package (for example, a version 1.2) for updating the version number currently exists; when an update package for updating the version exists, the OTA server feeds back, to the electronic device, a download address of filelist.xml corresponding to the update package (for example, a system incremental update package for updating from the version 1.1 to the version 1.2); and the electronic device downloads filelist.xml based on the download address of filelist.xml.

S503: The OUC obtains first available space of a user data partition.

S504: The OUC sets a compression attribute based on the first available space and fileSize, compressCowsize, and uncompressCowsize in filelist.xml.

For implementation details of step S501 to step S504, refer to the foregoing text description of FIG. 7.1 to FIG. 9. Details are not described herein again.

For ease of description, in this embodiment, for example, the set compression attribute is "false", in other words, the first available space is greater than a sum of fileSize and uncompressCowsize.

S505: The OUC obtains the update package from the OTA server.

For example, in a feasible implementation, after the electronic device initiates a request for obtaining the update package (for example, the version 1.2) to the OTA package server, the OTA server feeds back a download address of the update package (for example, a system incremental update package for updating from the version 1.1 to the version 1.2) to the electronic device; and the electronic device downloads the update package based on the download address of the update package, and stores the update package in the user data partition (Userdata).

S506: The OUC obtains fourth available space of the user data partition.

S507: The OUC sets the compression attribute based on the fourth available space, compressCowsize, and uncompressCowsize.

For implementation details of step S506 and step S507, refer to the foregoing text description of FIG. 7.2 to FIG. 10. Details are not described herein again.

For ease of description, this embodiment still uses the example in which the set compression attribute is "false", in other words, the fourth available space is greater than uncompressCowsize.

S508: An update engine in the electronic device updates a second static partition based on an update file that is in the update package and that corresponds to the second static partition.

For example, the system incremental update packet for updating from the version 1.1 to the version 1.2 includes full data of a static partition of the version 1.2. The electronic device overwrites the data in the static partition of the version 1.2 into the second static partition.

S509: The update engine reads the compression attribute that is set by the OUC, and determines an installation manner for the super partition.

S510: A snapshot process creates a corresponding cow file (compressed cow file or uncompressed cow file) in the user data partition based on the determined installation manner.

For example, a cow file corresponding to a System sub-partition is System_COW. It may be understood that if the determined installation manner is using a cow compression function, System_COW created in step S510 is a compressed cow file; or if the determined installation manner is not using the cow compression function, System_COW created in step S510 is an uncompressed cow file.

S511: The update engine writes an update file that is in the update package and that corresponds to the super partition into the corresponding cow file based on the determined installation manner.

For example, the update package includes data in a super partition of the version 1.2, and the electronic device writes the data in the super partition (Super) of the version 1.2 into the cow file created in the user data partition.

It may be understood that if the cow file is a compressed cow file, the data that is in the super partition of the version 1.2 and that is included in the update package is written into the compressed cow file in a compressed form; otherwise, the data that is in the super partition of the version 1.2 and that is included in the update package is directly written into an uncompressed cow file without being compressed.

Further, in an operating system update solution of the electronic device of the virtual AB system partition structure, an incremental update manner is used for the super partition (Super). In an update process, a cow file in the user data partition (Userdata) does not store all files in a super partition (Super) of a new version obtained after updating, but stores an update result, of data that is in a super partition (Super) of an old version and that needs to be updated, obtained after updating. In other words, the cow file in the user data partition (Userdata) stores update data of the super partition.

For ease of description, the following specifically describes super-partition updating by using an example in which no cow file needs to be used for super-partition updating.

A system sub-partition is used as an example. It is assumed that in the version 1.1, data in the system sub-partition may be divided into two parts: system1 and system2; and during updating from the version 1.1 to the version 1.2, the data system2 does not change, and the data system1 is updated to system3. In this case, in step S511, the electronic device creates a cow file in the user data partition (Userdata), and writes the data system3 into the cow file.

For example, a system incremental update package for updating from the version 1.1 to the version 1.2 includes update data that is of the super partition (Super) and that is for updating from the version 1.1 to the version 1.2, and the update data of the super partition (Super) includes the data system3.

Further, in an operating system update solution of the electronic device of the virtual AB system partition structure, incremental update of the super partition (Super) is implemented based on a snapshot (snapshot) technology. Specifically, the update data of the super partition (Super) is stored in the cow file in the user data partition (Userdata) by using a copy-on-write (Copy-On-Write, cow) file.

Specifically, the update data that is of the super partition (Super) and that is stored in the user data partition (Userdata) includes a plurality of cow files, each cow file corresponds to one sub-partition of the super partition (Super), and a name of the cow file corresponds to the sub-partition that is of the super partition (Super) and to which the cow file is specific.

In the update package obtained in step S505, the cow files of the update data of the super partition (Super) are compressed and stored in a form of binary code. In the update package, each cow file is named based on a sub-partition that is of the super partition (Super) and to which the cow file is specific. For example, a cow file specific to the System sub-partition is named system-cow-img.img.0000.

In step S511, the electronic device unpackages the update package to obtain all cow files, and appends an AB partition mark to each cow file. Specifically, when the electronic device currently boots from the first static partition, it may be understood that a super partition (Super) loaded by the electronic device for currently running an operating system is a super partition (A). When the operating system is updated, a cow file created in the user data partition (Userdata) is specific to a super partition (B). Therefore, a name mark _b corresponding to the super partition (B) is appended to the cow file. For example, _b is appended to system-cow-img.img.0000 to generate system_b-cow-img.img.0000.

Further, in step S511, an Update folder is created in the user data partition (Userdata), and a renamed cow file is stored in the Update folder. For example, in an application scenario, after the cow file is written into the user data partition (Userdata), the Update folder of the user data partition (Userdata) includes the following files:
- system_b-cow-img.img.0000;
- system_ext_b-cow-img.img.0000;
- vendor_b-cow-img.img.0000;
- product_b-cow-img.img.0000;
- cust_b-cow-img.img.0000; and
- odm_b-cow-img.img.0000.

Specifically, the cow file includes a cow file map (a snapshot map) of the cow file and update data.

The cow file map (snapshot map) corresponds to a file map of a sub-partition that is of the super partition (Super) and to which the cow file is specific. The file map of the sub-partition of the super partition (Super) is used to describe all files in a sub-partition of a super partition (Super) of an operating system of a current version (a version used before current-time updating, for example, the version 1.1) and a storage address of each file.

The update data in the cow file is an updated file in sub-partition data of a new version relative to sub-partition data of the current version. The cow file map of the cow file is used to describe a correspondence between the updated file and a file in the sub-partition of the current version and a storage address of the updated file.

Based on the file map of the sub-partition of the super partition (Super) and the cow file map in the cow file, a corresponding file in the sub-partition of the super partition (Super) can be replaced with the update data in the cow file, to update data in the super partition (Super). Specifically, when the file map of the sub-partition of the super partition (Super) needs to be obtained, a snapshot operation may be performed on data in the sub-partition of the super partition (Super) based on the snapshot technology, to generate the file map of the sub-partition of the super partition (Super). Alternatively, the file map of the sub-partition of the super partition (Super) may be generated in advance when the update package is produced, and the file map may be added to the cow file.

The System sub-partition is used as an example. It is assumed that data is stored in the System sub-partition according to the following path:
- /system/app/A0.XXX;
- /system/app/A1.XXX;
- /system/app/A2.XXX;
- /system/B0.XXX;
- /system/B1.XXX;
- /system/user/C0.XXX;
- /system/user/C1.XXX;
- /system/user/C2.XXX; and
- /system/user/C3.XXX.

A file map of the System sub-partition may be as follows:
- /system/app/A0.XXX: 024010~024013;
- /system/app/A1.XXX: 024014~024017;
- /system/app/A2.XXX: 024018~024020;
- /system/B0.XXX: 024021~024026;
- /system/B1.XXX: 024027~024028;
- /system/user/C0.XXX: 024029~024032;
- /system/user/C1.XXX: 024033~024035;
- /system/user/C2.XXX: 024036~024040; and
- /system/user/C3.XXX: 024041~024044.

A value (for example, 024010~024013 in/system/app/A0.XXX: 024010~024013) behind a file name is a physical storage address (block address) of the file in the System sub-partition of the super partition (Super).

It is assumed that data/system/app/A2.XXX and/system/user/C2.XXX needs to be updated during current operating system updating.

It may be considered that /system/app/A2.XXX and/system/user/C2.XXX are the system1 part of the data in the system sub-partition; and /system/app/A0.XXX,/system/app/A1.XXX,/system/B0.XXX,/system/B1.XXX, /system/user/C0.XXX, /system/user/C1.XXX, and/system/user/C3.XXX are the system2 part of the data in the system sub-partition.

Then, the cow file (system_b-cow-img.img.0000) specific to the System sub-partition includes/system/app/A2.XXX and/system/user/C2.XXX of the latest version.

It may be considered that/system/app/A2.XXX and/system/user/C2.XXX of the latest version are system3. An update objective is updating system1 to system3.

When a size of the update data in the cow file is consistent with a size of original data to be updated by using the update data, and a storage location that is of the update data in the cow file in the sub-partition and that is obtained after data updating is consistent with a storage location, of the original data to be updated by using the update data, in the sub-partition, the cow file map of the cow file (system_b-cow-img.img.0000) may be as follows:

/system/app/A2.XXX:
- Map1 (address of to-be-updated data in the original Super partition): start address address start: 024018 (an offset relative to a start address of the System sub-partition); and offset size size: 2 (data of an address segment 024018~024020); and
- Map2 (address of update data stored in the cow file): start address address start: 045033 (an offset relative to a start storage address of the cow file); and offset size size: 2 (data of an address segment 045033~045035); and /system/user/C2.XXX:
- Map1 (address of to-be-updated data in the original Super partition): start address address start: 024036 (an offset relative to the start address of the System sub-partition); and offset size size: 4 (data of an address segment 024036~024040); and
- Map2 (address of update data stored in the cow file): start address address start: 045036 (an offset relative to the start storage address of the cow file); and offset size size: 4 (data of an address segment 045036~045040).

When a size of the update data in the cow file is inconsistent with a size of original data to be updated by using the update data, the cow file map of the cow file (system_b-cow-img.img.0000) may be as follows:

/system/app/A2.XXX:
- Map1.1 (address of to-be-updated data in the original Super partition): start address address start: 024018 (an offset relative to a start address of the System sub-partition); and offset size size: 2 (data of an address segment 024018~024020);
- Map2.1 (address that is of update data stored in the cow file and that needs to overwrite the Map1.1 address): start address address start: 045033 (an offset relative to a start storage address of the cow file); and offset size size: 2 (data of an address segment 045033~045035);
- Map1.2 (to-be-written address, in the original super partition, of an excess part of the update data in the cow file relative to a size of the to-be-updated data): start address address start: 025018 (an offset relative to the system start address); and offset size size: 2 (data of an address segment 025018~025020); and
- Map2.2 (address that is of update data stored in the cow file and that needs to overwrite the Map1.2 address): start address address start: 046033 (an offset relative to the start storage address of the cow file); and offset size size: 2 (data of an address segment 046033~046035).

In the following description, for ease of description, only an application scenario in which the size of the update data in the cow file is consistent with the size of the original data to be updated by using the update data, and the storage location that is of the update data in the cow file in the sub-partition and that is obtained after data updating is consistent with the storage location, of the original data to be updated by using the update data, in the sub-partition is used as an example for description.

In the foregoing example, the address segments (045033~045035 and 045036~045040) are respectively physical storage addresses (block addresses), of /system/app/A2.XXX and/system/user/C2.XXX of the latest version in the cow file (system_b-cow-img.img.0000), in the user data partition (Userdata).

In this way, if A2.XXX at the address 024018~024020 is replaced with A2.XXX at the address 045033~045035, and C2.XXX at the address 024036~024040 is replaced with C2.XXX at the address 045036~045040, data updating of the System sub-partition of the super partition (Super) can be completed.

Further, in step S511, after the cow file is written into the user data partition (Userdata), the super partition (Super) and the cow file need to be checked as a whole, to check validity of the super partition (Super) and the cow file, and check whether a result of combining data in the super partition (Super) of the current version and the cow file is data in a super partition (Super) of the new version.

Specifically, for example, during updating from the version 1.1 to the version 1.2, a hash value of a result of combining data (data that does not change during updating from the version 1.1 to the version 1.2) that is in the super partition (Super) and that does not need to be updated and the update data (data that needs to be used for updating during updating from the version 1.1 to the version 1.2) in the cow file is calculated, to determine whether the hash value is consistent with a hash value of complete data in a super partition (Super) of the version 1.2. If the two hash values are consistent, it indicates that the cow file is valid. If the two hash values are inconsistent, it indicates that the cow file is invalid and updating fails. Therefore, an update process is interrupted and an error is reported. The hash value of the complete data in the super partition (Super) of the version 1.2 is stored in the update package.

Specifically, in a check process, the super partition (Super) and the cow file are combined based on the snapshot. In an implementation process of the snapshot, combination of the super partition (Super) and the cow file is not physical combination, but combination of the file map of the sub-partition of the super partition (Super) and the cow file map of the cow file, to generate a file map of the sub-partition data of the new version.

For example, the file map "/system/app/A0.XXX: 024010~024013; /system/app/A1.XXX: 024014~024017; /system/app/A2.XXX: 024018~024020; /system/B0.XXX: 024021~024026; /system/B1.XXX: 024027~024028; /system/user/C0.XXX: 024029~024032; /system/user/C1.XXX: 024033~024035; /system/user/C2.XXX: 024036~024040; and /system/user/C3.XXX: 024041~024044." of the System sub-partition and the cow file map "/system/app/A2.XXX: 045033~045035; and /system/user/C2.XXX: 045036~045040." are combined, to obtain a file map of the new version of the system sub-partition:

/system/app/A0.XXX: 024010~024013 (pointing to A0.XXX in/system/app in the super partition (Super));
/system/app/A1.XXX: 024014~024017 (pointing to A1.XXX in/system/app in the super partition (Super));
/system/app/A2.XXX: 045033~045035 (pointing to A2.XXX in/Update/system_b-cow-img.img.0000 in the user data partition (Userdata));
/system/B0.XXX: 024021~024026 (pointing to B0.XXX in/system in the super partition (Super));
/system/B1.XXX: 024027~024028 (pointing to B1.XXX in/system in the super partition (Super));
/system/user/C0.XXX: 024029~024032 (pointing to C0.XXX in/system/user in the super partition (Super));
/system/user/C1.XXX: 024033~024035 (pointing to C1.XXX in/system/user in the super partition (Super));
/system/user/C2.XXX: 045036~045040 (pointing to C2.XXX in/Update/system_b-cow-img.img.0000 in the user data partition (Userdata)); and
/system/user/C3.XXX: 024041~024044 (pointing to C3.XXX in/system/user in the super partition (Super)).

In the file map of the new version of the System sub-partition, a storage address of /system/app/A2.XXX does not point to/system/app/A2.XXX in the super partition (Super) in a memory, but points to A2.XXX in system_b-cow-img.img.0000 in the user data partition (Userdata) in the memory. A storage address of/system/user/C2.XXX does not point to /system/user/C2.XXX in the super partition (Super) in the memory, but points to C2.XXX in system_b-cow-img.img.0000 in the user data partition (Userdata) in the memory.

In a check process, file maps of the new version of all sub-partitions of the super partition (Super) are obtained in the foregoing combination manner (if a corresponding cow file of a sub-partition is not written into the user data partition (Userdata), a file map of the sub-partition is directly used as a file map of the new version). The file maps of the new version of all the sub-partitions are combined to generate a file system of the new version of the super partition (Super).

Data is read based on the file system of the new version of the super partition (Super), to read all files included in the file system of the new version of the super partition (Super) and calculate a hash value.

When the cow file is valid, merging status information in a metadata partition (/metadata) of the common partition (Common) is changed from "merged (Merged)" to "wait for merge (wait for Merge)". The merging status information is used to indicate whether there is currently a cow file that needs to be merged into the super partition (Super). Specifically, the merging status information includes an overall identifier for the super partition (Super) and a sub-partition identifier for each sub-partition. When the overall identifier is "merged (Merged)", it indicates that a merge operation needs to be performed on none of the sub-partitions of the super partition (Super). When the overall identifier is "wait for merge (wait for Merge)", it indicates that a merge operation needs to be performed on one or more sub-partitions of the super partition (Super). When the sub-partition identifier is "merged (Merged)", it indicates that a merge operation does not need to be performed on the sub-partition. When the sub-partition identifier is "wait for merge (wait for Merge)", it indicates that a merge operation needs to be performed on the sub-partition.

S512: The update engine sequentially checks the second static partition and the cow file corresponding to the super partition.

S513: The update engine changes a boot sequence of the electronic device from booting from the first static partition to booting from the second static partition.

For example, a boot sequence identifier of a master boot record (Master Boot Record, MBR) is overwritten, to overwrite the boot sequence identifier from A to B. After the electronic device is powered on, when the electronic device reads the boot sequence identifier A, the electronic device boots from the first static partition, and loads the data in the first static partition in a boot process. When the electronic device reads the boot sequence identifier B, the electronic device boots from the second static partition, and loads data in the second static partition in a boot process.

S514: The OUC triggers the electronic device to reboot.

For example, when triggering the electronic device to reboot, the OUC exits the current first operating system, powers off the electronic device, and then powers on the electronic device.

S515: The electronic device sequentially loads the data in the common partition, the data in the second static partition, the data in the super partition, and the data in the cow file in the user data partition, and boots from the second static partition to run the second operating system.

For example, the electronic device first loads data in the common partition (Common). In a process of loading the common partition (Common), the electronic device reads a boot mark in the common partition (Common). When the boot mark in the common partition (Common) is (A), the device loads the first static partition after loading the common partition (Common), to boot from the first static partition. When the boot mark in the common partition (Common) is (B), the electronic device loads the second static partition after loading the common partition (Common), to boot from the second static partition.

In S515, the electronic device reads the boot mark in the common partition (Common). The boot mark in the common partition (Common) is (B). The electronic device loads the second static partition after loading the common partition (Common), and boots from the second static partition.

For example, when the electronic device loads the data in the super partition (Super) and the data in the cow file in the user data partition (Userdata) after loading the data in the second static partition, specifically, the electronic device reads the merging status information in the metadata (/metadata), determines, based on the merging status information, whether it is necessary to retrieve the cow file from a specified path of the user data partition (Userdata), and combine and load the super partition (Super) and the cow file by using the snapshot.

Further, in step S515, the electronic device does not load the super partition (Super) and all cow files in the user data partition (Userdata), but loads a corresponding file based on a running requirement of the second operating system. Specifically, in step S515, the electronic device determines, based on the running requirement of the second operating system, a file that needs to be loaded, extracts, based on the snapshot, the corresponding file from the super partition (Super) or the cow files in the user data partition, and loads the corresponding file.

Specifically, in step S515, when corresponding cow files exist for sub-partitions of the super partition (Super), a file map of a new version of each sub-partition of the super partition (Super) is first generated based on the snapshot. For a process of generating the file map of the new version, refer to step S511. The electronic device determines, based on the running requirement of the second operating system, the file that needs to be loaded, and loads the file based on a file map of the new version of a sub-partition of the super partition (Super).

For example, the running requirement of the second operating system is loading all data in a directory "user (/system/user)" in the System sub-partition. The electronic device reads the merging status information in the metadata (/metadata), where a sub-partition identifier of the System sub-partition in the merging status information is "wait for merge (wait for Merge)". Therefore, the electronic device searches/Update in the user data partition (Userdata) for a cow file, and after finding the cow file system_b-cow-img.img.0000 from/Update, generates the file map of the new version of the System sub-partition based on the snapshot and the file map of the cow file in system_b-cow-img.img.0000. Data is loaded based on storage addresses of all files in/system/user in the file map of the new version of the System sub-partition. For example, C0.XXX at the address 024029~024032, C1.XXX at the address 024033~024035, C2.XXX at the address 045036~045040, and C3.XXX at the address 024041~024044 are loaded based on the following file map of the new version of the System sub-partition:

/system/user/C0.XXX: 024029~024032;
/system/user/C1.XXX: 024033~024035;
/system/user/C2.XXX: 045036~045040; and
/system/user/C3.XXX: 024041~024044.

Further, at the time of loading all the data in the directory "user (/system/user)" in the System sub-partition, when the sub-partition identifier of the System sub-partition in the merging status information is "merged (Merged)", the electronic device does not search/Update in the user data partition (Userdata) for a cow file, but directly loads all the data in the directory "user (/system/user)" in the System sub-partition.

Further, at the time of loading all the data in the directory "user (/system/user)" in the System sub-partition, when the sub-partition identifier of the System sub-partition in the merging status information is "wait for merge (wait for Merge)", if the electronic device finds no cow file corresponding to the System sub-partition from/Update in the user data partition (Userdata), it indicates a data writing error (a cow file writing error or a merging status information writing error) in an update process. In this case, the electronic device rolls back to the first operating system and reports log information of an update failure to the OTA server.

Further, in a process of loading the data in the super partition (Super) and the cow file in the user data partition (Userdata), before loading a file, the electronic device further needs to check the to-be-loaded file. Different from step S511, in step S515, the super partition (Super) and the cow file are not checked as a whole, but only the file that needs to be loaded is checked. For example, check is performed based on dmverity (dm-verity is a target (target) of a dm (device mapper), is a virtual block electronic device, and is specially used to check a file system). If check succeeds, the file is loaded. If check fails, the electronic device is rebooted to roll back to the first operating system, or an attempt is made on loading the file again.

S516: The electronic device successfully boots, and enters a user interaction interface.

S517: A kernel performs a Merge operation.

It may be understood that, in this application, the Merge operation specifically means that the update file (cow file) that is of the super partition (Super) and that is stored in the user data partition (Userdata) is written into the super partition (Super) in an operating system update process, to update data in a file in the super partition (Super), so that the electronic device does not need to load the super partition (Super) or the cow file in the user data partition when booting next time, and the electronic device can complete booting by loading only the super partition (Super).

Specifically, the electronic device performs power-on broadcast after successful boot, and starts an update process after power-on broadcast. The update process reads the merging status information in the metadata (/metadata) of the common partition (Common). If the merging status information is "merged (Merged)", the electronic device enters a normal running mode.

If the merging status information is "wait for merge (wait for Merge)", the update process merges the cow file in the user data partition (Userdata) into the super partition (Super).

Specifically, the update process writes the update data in the cow file in the user data partition (Userdata) into a corresponding address in the super partition (Super), so that all data in the super partition (Super) is updated data of the new version.

For example, data at the address 045033~045035 is written into the address 024014~024017 based on/system/app/A2.XXX: 024018~024020 in the file map of the System sub-partition and/system/app/A2.XXX: 045033~045035 in the cow file map, and data at the address 045036~045040 is written into the address 024036~024040 based on /system/user/C2.XXX: 024036~024040 in the file map of the System sub-partition and /system/user/C2.XXX: 045036~045040 in the cow file map.

Afterward, the update process deletes the cow file in the user data partition (Userdata) to return storage space to the user data partition (Userdata); and changes the merging status information in the metadata (/metadata) of the common partition (Common) from "wait for merge (wait for Merge)" to "merged (Merged)".

In step S508, the data operation for static-partition updating is specific to operating system data in the second static partition, and does not affect operating system data in the currently-booted first static partition. In addition, in step S511, the data operation for super-partition updating is completed on a virtual super partition created in the user data partition (Userdata), and does not affect the currently-mounted super partition (Super). Therefore, a user can normally use the electronic device in an entire operating system update process. In addition, after step S513 is completed, the electronic device does not need to immediately reboot, and the user can select a reboot occasion. In this way, the operating system update process does not affect a normal mobile phone operation of the user, thereby greatly improving user experience. Further, for the super partition (Super), the virtual super partition is created in the user data partition (Userdata) only when updating needs to be performed. Therefore, utilization of data storage space is effectively improved.

S518: The kernel synchronizes the data in the second static partition to the first static partition.

Based on the foregoing update procedure, assuming that the first static partition corresponds to an operating system of the version 1.1, the electronic device boots from the first static partition to run the operating system of the version 1.1. When the operating system is updated to 1.2, the electronic device boots from the second static partition after reboot, to run an operating system of the version 1.2. In this case, the electronic device runs the operating system of the version 1.2. The first static partition corresponds to the operating system of the version 1.1, the second static partition corresponds to the operating system of the version 1.2, and the data in the first static partition is inconsistent with the data in the second static partition. If an error occurs in the second static partition, the first static partition cannot function as the second static partition, in other words, the first static partition cannot support the electronic device in running the operating system of the version 1.2. However, if data consistency between the first static partition and the second static partition is always kept, the other static partition can be used when an error occurs in the first static partition or the second static partition.

Therefore, after the Merge operation is completed, partition synchronization is performed on the static partition, to be specific, data backup is performed between the first static partition and the second static partition, to keep data consistency between the first static partition and the second static partition, so that the foregoing technical problem can be resolved.

For details of a specific implementation in which the kernel synchronizes the data in the second static partition to the first static partition, refer to the foregoing text description of step S125 in FIG. 8.4. Details are not described herein again.

In addition, it should be noted that, in an actual application scenario, the operating system update method that is provided in the foregoing embodiments and that is implemented by the electronic device may be performed by a chip system included in the electronic device. The chip system may include a processing circuit, a receiving pin, and a sending pin. The receiving pin, the sending pin, and the processing circuit communicate with each other by using an internal connection channel. The processing circuit is coupled to a memory, so that when the chip system runs, a computer program stored in the memory is invoked to implement the foregoing steps performed by the electronic device.

In addition, it should be noted that the processing circuit in the chip system may be an application processor or a non-application processor.

In addition, an embodiment of this application further provides a computer-readable storage medium. The computer storage medium stores computer instructions. When the computer instructions are run on an electronic device, the electronic device is enabled to perform the foregoing related method steps to implement the operating system update method in the foregoing embodiments.

In addition, an embodiment of this application further provides a computer program product. When the computer program product is run on an electronic device, the electronic device is enabled to perform the foregoing related steps to implement the operating system update method in the foregoing embodiments.

In addition, it may be learned from the foregoing description that, all of the electronic device, the computer-readable storage medium, the computer program product, and the chip provided in the embodiments of this application are configured to perform the corresponding method provided above. Therefore, for beneficial effects that can be achieved by the electronic device, the computer-readable storage medium, the computer program product, and the chip, refer to the beneficial effects of the corresponding method provided above. Details are not described herein again.

As described above, the foregoing embodiments are merely intended to describe the technical solutions of this application, but not intended to limit this application. Although this application is described in detail with reference to the foregoing embodiments, persons of ordinary skill in the art should understand that they can still make modifications to the technical solutions described in the foregoing embodiments or make equivalent replacements to some technical features thereof, without departing from the scope of the technical solutions of the embodiments of this application.

What is claimed is:

1. An operating system update method, applied to an electronic device, wherein the electronic device comprises a super partition and a user data partition, and the method further comprises:
   obtaining file list description information corresponding to an update package, wherein the file list description information indicates a first size of the update package, a second size that is of a first update file in the update package and that is obtained after compression, and a third size that is of the first update file and that exists before compression, and the first update file corresponds to a first sub-partition of the super partition; and
   performing the following:
      creating a first copy-on-write (cow) file corresponding to the first sub-partition in the user data partition when first available space of the user data partition is greater than a sum of the first size and the third size, wherein the first available space is available space that is of the user data partition and that exists before the update package is downloaded; or
      creating a second cow file corresponding to the first sub-partition in the user data partition when first available space of the user data partition is greater than a sum of the first size and the second size and less than the sum of the first size and the third size, wherein a size of the first cow file is greater than a size of the second cow file.

2. The method according to claim 1, wherein
   the size of the first cow file is equal to a value obtained by subtracting second available space and the first size from the first available space, and the second available space is available space that is of the user data partition and that is obtained after the update package is downloaded and the first cow file is created; and
   the size of the second cow file is equal to a value obtained by subtracting third available space and the first size from the first available space, and the third available space is available space that is of the user data partition and that is obtained after the update package is downloaded and the second cow file is created.

3. The method according to claim 1, wherein the creating a first copy-on-write (cow) file corresponding to the first sub-partition in the user data partition when first available space of the user data partition is greater than a sum of the first size and the third size comprises:
   setting an identifier corresponding to a compression attribute to a first identifier when the first available space of the user data partition is greater than the sum of the first size and the third size, wherein the first identifier indicates that the first update file is not installed by using a cow compression function; and
   creating the first cow file corresponding to the first sub-partition in an uncompressed form in the user data partition based on the first identifier.

4. The method according to claim 3, wherein before the creating the first cow file corresponding to the first sub-partition in an uncompressed form in the user data partition based on the first identifier, the method further comprises:
   obtaining the update package.

5. The method according to claim 4, wherein after obtaining the update package, and before the performing creating the first cow file corresponding to the first sub-partition in an uncompressed form in the user data partition based on the first identifier, the method further comprises:
   setting the identifier corresponding to the compression attribute to the first identifier when fourth available space of the user data partition is greater than the third size, wherein the fourth available space is available space that is of the user data partition and that is obtained after the update package is downloaded; or
   setting the identifier corresponding to the compression attribute to a second identifier when fourth available space of the user data partition is greater than the second size and less than the third size, wherein the second identifier indicates that the first update file is installed by using the cow compression function.

6. The method according to claim 5, wherein after the creating the first cow file corresponding to the first sub-partition in an uncompressed form in the user data partition based on the first identifier, the method further comprises:
   writing, in an uncompressed form, data in the first update file into the first cow file that corresponds to the first sub-partition and that is created in the uncompressed form in the user data partition.

7. The method according to claim 6, wherein the creating a second cow file corresponding to the first sub-partition in the user data partition when first available space of the user data partition is greater than a sum of the first size and the second size and less than the sum of the first size and the third size comprises:
   setting the identifier corresponding to the compression attribute to the second identifier when the first available space of the user data partition is greater than the sum of the first size and the second size and less than the sum of the first size and the third size, wherein the second identifier indicates that the first update file is installed by using the cow compression function; and
   creating the second cow file corresponding to the first sub-partition in a compressed form in the user data partition based on the second identifier.

8. The method according to claim 7, wherein before the creating the second cow file corresponding to the first sub-partition in a compressed form in the user data partition based on the second identifier, the method further comprises:
   obtaining the update package.

9. The method according to claim 8, wherein after obtaining the update package, and before the performing creating the second cow file corresponding to the first sub-partition in a compressed form in the user data partition based on the second identifier, the method further comprises:
   setting the identifier corresponding to the compression attribute to the first identifier when fourth available space of the user data partition is greater than the third size, wherein the first identifier indicates that the first update file is not installed by using the cow compression function, and the fourth available space is available space that is of the user data partition and that is obtained after the update package is downloaded; or
   setting the identifier corresponding to the compression attribute to the second identifier when fourth available space of the user data partition is greater than the second size and less than the third size.

10. The method according to claim 9, wherein after the creating the second cow file corresponding to the first sub-partition in a compressed form in the user data partition based on the second identifier, the method further comprises:

writing, in a compressed form, the data in the first update file into the second cow file that corresponds to the first sub-partition and that is created in the compressed form in the user data partition.

11. The method according to claim 10, wherein the writing, in a compressed form, the data in the first update file into the second cow file that corresponds to the first sub-partition and that is created in the compressed form in the user data partition comprises:
removing all binary os from the data in the first update file; and
writing data obtained after all binary os are removed into the second cow file that corresponds to the first sub-partition and that is created in the compressed form in the user data partition.

12. The method according to claim 11, wherein the method further comprises:
when the first available space of the user data partition is greater than the sum of the first size and the third size, skipping, by the electronic device, performing a read/write operation other than operating system updating on the user data partition in an operating system update process; or
when the first available space of the user data partition is greater than the sum of the first size and the second size and less than the sum of the first size and the third size, skipping, by the electronic device, performing a read/write operation other than operating system updating on the user data partition in an operating system update process.

13. The method according to claim 12, wherein the method further comprises:
when the first available space is less than the sum of the first size and the second size, making a prompt to clean the user data partition.

14. The method according to claim 13, wherein the making a prompt to clean the user data partition comprises:
determining a first difference between the sum of the first size and the second size and the first available space; and
making a prompt to clean at least space of the first difference in the user data partition.

15. The method according to claim 12, wherein the method further comprises:
when the fourth available space is less than the second size, making a prompt to clean the user data partition.

16. The method according to claim 15, wherein the making a prompt to clean the user data partition comprises:
determining a second difference between the second size and the fourth available space; and
making a prompt to clean at least space of the second difference in the user data partition.

17. An electronic device, wherein the electronic device comprises a super partition, and a user data partition, a memory coupled to a processor, and wherein the memory stores program instructions; and
when the program instructions are executed by the processor, the electronic device is enabled to perform the following:
obtaining file list description information corresponding to an update package, wherein the file list description information indicates a first size of the update package, a second size that is of a first update file in the update package and that is obtained after compression, and a third size that is of the first update file and that exists before compression, and the first update file corresponds to a first sub-partition of the super partition; and
performing the following:
creating a first copy-on-write (cow) file corresponding to the first sub-partition in the user data partition when first available space of the user data partition is greater than a sum of the first size and the third size, wherein the first available space is available space that is of the user data partition and that exists before the update package is downloaded; or
creating a second cow file corresponding to the first sub-partition in the user data partition when first available space of the user data partition is greater than a sum of the first size and the second size and less than the sum of the first size and the third size, wherein a size of the first cow file is greater than a size of the second cow file.

18. A non-transitory computer-readable storage medium, comprising a computer program, wherein when the computer program is run on an electronic device, the electronic device is enabled to perform the following operations:
obtaining file list description information corresponding to an update package, wherein the file list description information indicates a first size of the update package, a second size that is of a first update file in the update package and that is obtained after compression, and a third size that is of the first update file and that exists before compression, and the first update file corresponds to a first sub-partition of a super partition; and
performing the following:
creating a first copy-on-write (cow) file corresponding to the first sub-partition in a user data partition when first available space of the user data partition is greater than a sum of the first size and the third size, wherein the first available space is available space that is of the user data partition and that exists before the update package is downloaded; or
creating a second cow file corresponding to the first sub-partition in the user data partition when first available space of the user data partition is greater than a sum of the first size and the second size and less than the sum of the first size and the third size, wherein a size of the first cow file is greater than a size of the second cow file.

19. The non-transitory computer-readable storage medium according to claim 18, wherein
the size of the first cow file is equal to a value obtained by subtracting second available space and the first size from the first available space, and the second available space is available space that is of the user data partition and that is obtained after the update package is downloaded and the first cow file is created; and
the size of the second cow file is equal to a value obtained by subtracting third available space and the first size from the first available space, and the third available space is available space that is of the user data partition and that is obtained after the update package is downloaded and the second cow file is created.

20. The method according to claim 1, wherein the electronic device further comprises a processor and a memory, the memory further comprises a common partition, a first static partition, a second static partition, a super partition, and a user data partition, the electronic device sequentially loads data in the common partition, data in the first static partition, and data in the super partition after boot, to run a first operating system, and performing, after the first operating system is run, obtaining the file list description information corresponding to the update package.

\* \* \* \* \*

UNITED STATES PATENT AND TRADEMARK OFFICE
CERTIFICATE OF CORRECTION

PATENT NO. : 12,436,754 B2
APPLICATION NO. : 18/268055
DATED : October 7, 2025
INVENTOR(S) : Chen et al.

Page 1 of 1

It is certified that error appears in the above-identified patent and that said Letters Patent is hereby corrected as shown below:

In the Claims

In Column 51, in Claim 11, Line 10, delete "os" and insert -- 0s --.

In Column 51, in Claim 11, Line 12, delete "os" and insert -- 0s --.

Signed and Sealed this
Second Day of December, 2025

John A. Squires
*Director of the United States Patent and Trademark Office*